United States Patent
Manden et al.

(10) Patent No.: US 9,705,819 B1
(45) Date of Patent: Jul. 11, 2017

(54) DEVICES, SYSTEMS, APPARATUS, AND METHODS FOR TRANSPARENT AND AUTOMATED OPTIMIZATION OF STORAGE RESOURCE ALLOCATION IN A CLOUD SERVICES SYSTEM

(71) Applicant: FittedCloud, Inc., Boxborough, MA (US)

(72) Inventors: Prakash Manden, Boxborough, MA (US); Prashant Parikh, Holtsville, NY (US); Jin Ren, Acton, MA (US); Jienhua Huang, Billerica, MA (US)

(73) Assignee: FittedCloud, Inc., Boxborough, MA (US)

( * ) Notice: Subject to any disclaimer, the term of this patent is extended or adjusted under 35 U.S.C. 154(b) by 0 days.

(21) Appl. No.: 15/345,346

(22) Filed: Nov. 7, 2016

Related U.S. Application Data

(63) Continuation of application No. 15/181,278, filed on Jun. 13, 2016, now Pat. No. 9,524,111.

(60) Provisional application No. 62/304,829, filed on Mar. 7, 2016.

(51) Int. Cl.
| | | |
|---|---|---|
| H04L 12/919 | (2013.01) | |
| H04L 29/08 | (2006.01) | |
| H04L 12/911 | (2013.01) | |
| H04L 12/927 | (2013.01) | |

(52) U.S. Cl.
CPC .......... *H04L 47/765* (2013.01); *H04L 47/743* (2013.01); *H04L 47/805* (2013.01); *H04L 67/1095* (2013.01); *H04L 67/1097* (2013.01)

(58) Field of Classification Search
CPC ............. G06F 17/30256; G06F 3/0611; G06F 3/0631; G06F 3/0685
See application file for complete search history.

(56) References Cited

U.S. PATENT DOCUMENTS

2011/0093862 A1* 4/2011 Doatmas ............... G06F 3/0617
                                                              718/105

* cited by examiner

*Primary Examiner* — Yong Choe
(74) *Attorney, Agent, or Firm* — Jonathan A. Tyler

(57) ABSTRACT

A device or system includes a plurality of storage resources each associated with a respective performance class, each being associated with selected performance characteristics such as IOPS, bandwidth, etc. The device or system includes a compute instance having access to allocated storage resources, the allocated storage devices including one or more storage resources. The device or system also includes an optimization component adapted to obtain information relating to utilization by the compute instance component of the allocated storage resources, determine that a change to the allocated storage resources is necessary, based on the information, cause data to be migrated from a first storage resource associated with a first performance class to a second storage resource associated with a second storage class, and cause a removal from the allocated storage resources of the first storage resource and an addition to the allocated storage resources of the second storage resource.

19 Claims, 33 Drawing Sheets

DEVICES, SYSTEMS, APPARATUS, AND METHODS FOR TRANSPARENT AND AUTOMATED OPTIMIZATION OF STORAGE RESOURCE ALLOCATION IN A CLOUD SERVICES SYSTEM

This application is a continuation of application Ser. No. 15/181,278 filed Jun. 13, 2016 which claims priority to U.S. Provisional Patent Application No. 62/304,829, filed Mar. 7, 2016, the entire disclosure of both of which are incorporated herein by reference in its entirety.

TECHNICAL FIELD

This specification relates generally to the storage of data, and more particularly to devices, systems, apparatus, and methods for transparent and automatic optimization of storage resource allocation in a cloud services system.

BACKGROUND

Public cloud systems have become increasingly popular in recent years. The cloud services provided by public cloud systems have transformed the information technology (IT) industry as customers have moved on-site IT infrastructures into public clouds. Ease of provisioning has contributed to the popularity of the public cloud new model. In many cases, a user can create a "virtual machine" with a fully installed operating system and various applications pre-installed, with just a few clicks of a mouse. Typically, the user can also select how much processing capacity and storage capacity the virtual machine will have at the time the virtual machine is created.

On-demand allocation of processing and storage resources allows a user to allocate only the amount of resources that are expected to be required by a particular application. For example, a user of a particular database application can forecast the maximum storage capacity that will be needed and allocate storage capacity to meet that requirement (and no more). In a specific example, if a user expects a particular database application to need a maximum storage capacity of 300 GB, the user can request an allocation of 300 GB of storage capacity for the database application. The cloud services system then allocates 300 GB for the application. This on-demand capability enables users to avoid expenditures for processing and storage capacity that will most likely never be used.

SUMMARY

Devices, systems, apparatus, and methods for transparent and automatic optimization of storage resource allocation in a cloud services system are provided. Systems and methods described herein may be implemented using a single device having a plurality of storage resources, and/or using a plurality of devices within a network in which storage resources are distributed.

In accordance with an embodiment, a device includes a plurality of storage resources, each storage resource associated with one of a plurality of performance classes, each performance class being associated with one or more performance characteristics. Each storage resource includes a predetermined amount of storage capacity and may include, or reside within, a storage device, a storage system, etc. The device also includes a compute instance component having access to allocated storage resources, the allocated storage devices including one or more of the plurality of storage resources. The device also includes an optimization component adapted to obtain information relating to utilization by the compute instance component of the allocated storage resources, determine that a change to the allocated storage resources is necessary, based on the information, cause data to be migrated from a first storage resource associated with a first performance class to the second storage resource associated with a second storage class, and cause a removal from the allocated storage resources of the first storage resource and an addition to the allocated storage resources of the second storage resource.

In one embodiment, each storage resource includes one of a hard disk drive, a solid state drive, a flash memory device, a tape drive, and an optical storage device. Alternatively, each storage resource may include storage space on one of a hard disk drive, a solid state drive, a flash memory device, a tape drive, and an optical storage device.

In another embodiment, the first performance class is associated with a first measure of input/output operations per second (IOPS), and the second performance class is associated with a second measure of IOPS lower than the first measure of IOPS.

In another embodiment, the information includes one of data relating to allocated storage capacity, used storage capacity, input/output operations per second (IOPS).

In another embodiment, the first performance class is associated with a first measure of bandwidth, and the second performance class is associated with a second measure of bandwidth different from the first measure of bandwidth.

In another embodiment, the first performance class is associated with a first measure of latency, and the second performance class is associated with a second measure of latency different from the first measure of latency.

In accordance with another embodiment, a system for allocating access to storage devices distributed within a network is provided. The system includes a plurality of storage devices distributed within a network, each storage device associated with one of a plurality of performance classes, and a compute instance component having access to allocated storage devices, the allocated storage devices including one or more of the plurality of storage devices. The system also includes an optimization component adapted to obtain information relating to utilization by the compute instance component of the allocated storage devices, determine that a change to the allocated storage devices is necessary, based on the information, cause data to be migrated from a first storage device associated with a first performance class to a second storage device associated with a second performance class, and cause a removal from the allocated storage devices of the first storage device and an addition to the allocated storage devices of the second storage device.

In one embodiment, each storage device includes one of a hard disk drive, a solid state drive, a flash memory device, a tape drive, and an optical storage device.

In another embodiment, the system also includes an agent component residing on the compute instance, wherein the agent component is adapted to obtain the information and transmit the information to the optimization component.

In another embodiment, the system also includes a server computer. The compute instance component resides and operates on the server computer.

In another embodiment, the first performance class is associated with a first measure of input/output operations per second (IOPS), and the second performance class is associated with a second measure of IOPS lower than the first measure of IOPS.

In another embodiment, the information includes one of data relating to allocated storage capacity, used storage capacity, input/output operations per second (IOPS).

In another embodiment, the first performance class is associated with a first measure of bandwidth, and the second performance class is associated with a second measure of bandwidth different from the first measure of bandwidth.

In another embodiment, the first performance class is associated with a first measure of latency, and the second performance class is associated with a second measure of latency different from the first measure of latency.

In accordance with another embodiment, a system for allocating access to storage resources distributed within a network is provided. The system includes a plurality of storage resources distributed within a network, each storage resource associated with one of a plurality of performance classes, and a compute instance component having access to allocated storage resources, the allocated storage resources including one or more of the plurality of storage resources. The system also includes an optimization component adapted to obtain information relating to utilization by the compute instance component of the allocated storage resources, determine that a change to the allocated storage resources is necessary, based on the information, cause data to be migrated from a first storage resource associated with a first performance class to a second storage resource associated with a second performance class, and cause a removal from the allocated storage resources of the first storage resource and an addition to the allocated storage resources of the second storage resource.

In accordance with another embodiment, a device includes a processor, a memory adapted to store data, and an optimization component communicatively coupled to the memory. The optimization component is adapted to receive information relating to utilization, by a compute instance operating within a network, of allocated storage resources, the allocated storage resources including a first storage resource associated with a first performance class and a second storage resource associated with a second performance class. The optimization component is also adapted to determine that a change to the allocated storage resources is necessary, based on the information, and cause a removal from the allocated storage resources of the first storage resource and an addition to the allocated storage resources of the second storage resource.

In one embodiment, the information includes one of data relating to allocated storage capacity, used storage capacity, input/output operations per second (IOPS).

In another embodiment, the first performance class is associated with a first measure of input/output operations per second (IOPS), and the second performance class is associated with a second measure of IOPS lower than the first measure of IOPS.

In another embodiment, a system includes a plurality of processing resources, one or more first storage resources associated with a first performance class, each storage resource including a first storage device associated with the first performance class, and one or more second storage resources associated with a second performance class, each storage resource including a second storage device associated with the second performance class. Each processing resource may include a CPU, for example. Each storage resource may include a storage device or storage system, for example. The system also includes a first server device that includes a compute instance having access to a specified processing capacity and to a specified storage capacity, an application residing on the compute instance, and a cloud manager component. The cloud manager component is adapted to allocate to the compute instance one or more processing resources among the plurality of processing resources based on the specified processing capacity, and allocate a first set of storage resources to the compute instance based on the specified storage capacity, the first set of storage resources including at least one of the one or more first storage resources and one of the one or more second storage resources. The system also includes a second server device that includes an optimization component. The optimization component is adapted to obtain storage resource utilization data relating to utilization by the compute instance of the allocated storage resources, determine that a change to the allocated storage resources is necessary, based on the storage resource utilization data, and cause the cloud manager component to allocate a second set of storage resources to the compute instance, the second set of storage resources including at least one of the one or more first storage resources and one of the one or more second storage resources, the second set of storage resources being different from the first set of storage resources.

In accordance with another embodiment, a method is provided. An agent component is installed on a compute instance residing in a cloud services system, the compute instance including a specified processing capacity and a specified storage capacity, wherein one or more processing resources in the cloud services system are allocated to the compute instance and one or more storage resources in the cloud services system are allocated to the compute instance, wherein the one or more storage resources have a second storage capacity. Information relating to utilization by the compute instance of the one or more storage resources allocated to the compute instance is received from the agent component. A third storage capacity actually utilized by the compute instance is determined, based on the information. A difference between the third storage capacity actually utilized by the compute instance and the second storage capacity of the one or more storage resources allocated to the compute instance is determined. An adjustment to an allocation of storage resources associated with the compute instance is caused based on the difference.

In one embodiment, a request for registration is received from the compute instance.

In another embodiment, the third storage capacity actually utilized by the compute instance is less than the second storage capacity of the one or more storage resources allocated to the compute instance. A second allocation of one or more second storage resources to the compute instance is caused. Data is migrated, by the agent component, from the one or more storage resources to the one or more second storage resources. A removal of the one or more storage resources from the allocation of storage resources associated with the compute instance is caused.

In another embodiment, the third storage capacity actually utilized by the compute instance is greater than the second storage capacity of the one or more storage resources allocated to the compute instance. A second allocation of one or more second storage resources to the compute instance is caused.

In accordance with another embodiment, a system for allocating access to storage resources distributed within a network is provided. The system includes a plurality of processing resources distributed within a network, and a plurality of storage resources distributed within the network. Each storage resource is associated with one of a plurality of performance classes. The system also includes a compute instance component having access to allocated processing resources and to allocated storage resources. The allocated storage resources include one or more of the plurality of storage resources. The system also includes an optimization component adapted to obtain information relating to utilization by the compute instance component of the allocated storage resources, determine that a change to the allocated storage resources is necessary, based on the information, cause data to be migrated from a first storage resource associated with a first performance class to a second storage resource associated with a second performance class, and cause a removal from the allocated storage resources of the first storage resource and an addition to the allocated storage devices of the second storage resource.

A determination that a change to allocated storage devices or allocated storage resources may be made based on criteria relating to comparisons between actual and expected utilization of storage resources and/or data, cost considerations, an expected data life cycle, prioritization of a first type of data relative to a second type of data, and other factors.

In other embodiments, a first performance class may be associated with a first performance attribute defining an aspect of performance of a storage resource (e.g., a specific storage capacity, a specific cost, a specific IOPS, a specific latency, a specific bandwidth, etc.). In one embodiment, allocated storage resources include one or more storage resources having the first performance attribute. The optimization module may determine that a change to the allocated storage resources is necessary, for example, in response to a determination that a discrepancy, mismatch, inconsistency, or conflict exists between the first performance attribute and the actual utilization of the allocated storage resources. For example, the optimization module may determine that the first performance attribute does not satisfy requirements associated with actual utilization of the allocated storage resources. Alternatively, the optimization module may determine that a change to the allocated storage resources is necessary, based on a determination that a measure of actual utilization of the first performance attribute is less than a predetermined threshold. In response to the determination, a storage resource having a second performance attribute may be added to the allocated storage resources.

These and other advantages of the present disclosure will be apparent to those of ordinary skill in the art by reference to the following Detailed Description and the accompanying drawings.

DETAILED DESCRIPTION

Figure 1:
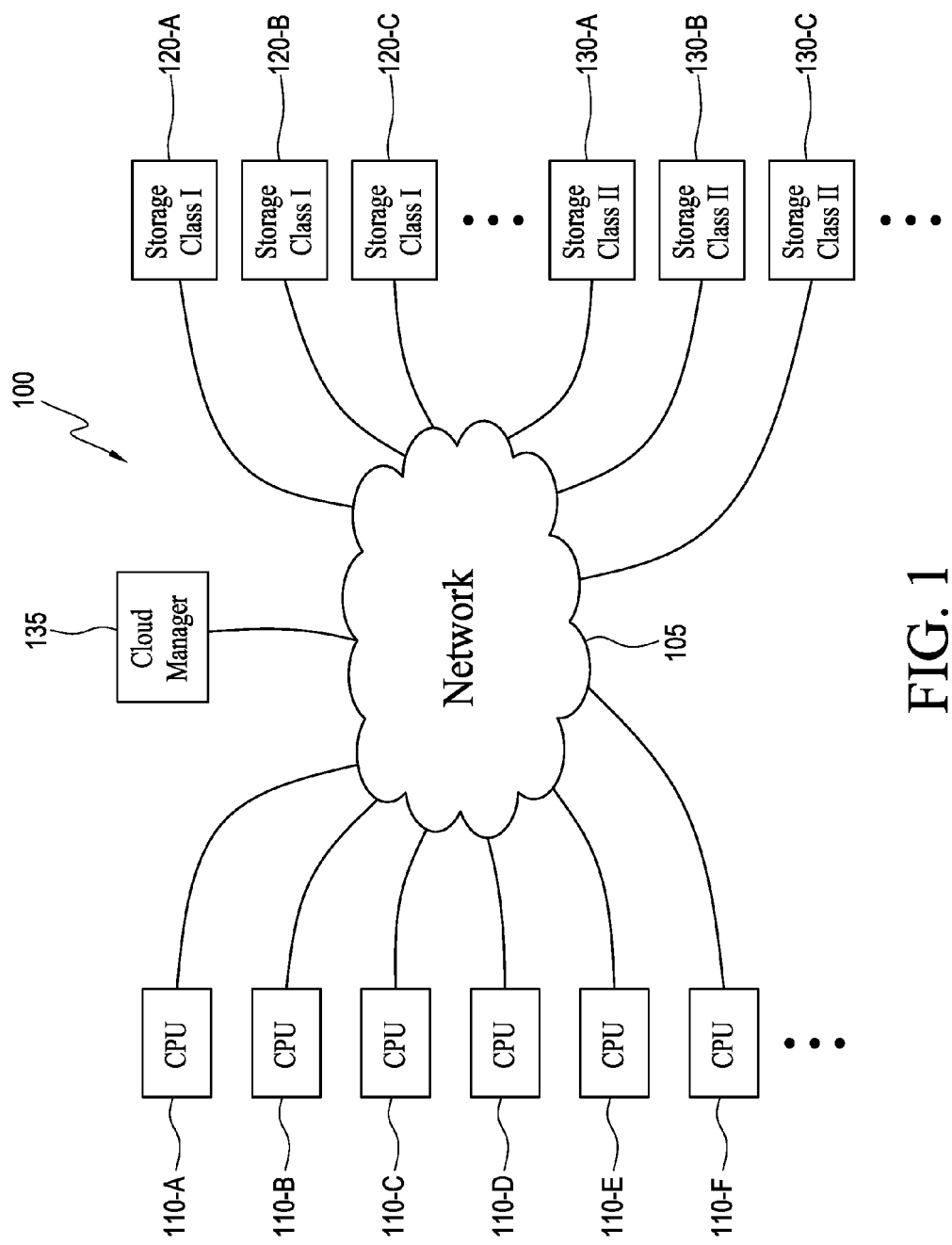
FIG. 1 shows a system of resources that may be used in a cloud services system in accordance with an embodiment.

Devices, systems, apparatus, and methods for transparent and automatic optimization of storage resource allocation in a cloud services system are provided. Systems and methods described herein may be implemented using a single device having a plurality of storage resources, and/or using a plurality of devices within a network in which storage resources are distributed.

In accordance with an embodiment, a cloud services system includes a plurality of processing resources, which may be CPU resources, for example, and a plurality of storage resources. A compute instance having a specified processing capacity and a specified storage capacity is generated and operates within the cloud services system. One or more CPU resources are allocated to the compute instance, and one or more storage resources are allocated to the compute instance. The allocated storage resources have a second storage capacity. An agent component is installed on the compute instance. An optimization module, also referred to as an optimization component, receives from the agent component storage resource utilization information relating to utilization by the compute instance of the storage resources allocated to the compute instance. The optimization module adjusts the allocation of storage resources to the compute instance based on the storage resource utilization information. For example, a difference between a third storage capacity actually utilized by the compute instance and the second storage capacity of the storage resources allocated to the compute instance may be determined, and the allocation of storage resources to the compute instance may be adjusted based on the difference.

Cloud services systems offering on-demand allocation of processing and storage resources allow users to allocate only the amount of resources that are expected to be required by a particular application. For example, a user of a particular database application can forecast the maximum storage capacity that will be needed and allocate storage capacity to meet that requirement (and no more). In a specific example, if a user expects a particular database application to need a maximum storage capacity of 300 GB, the user can request an allocation of 300 GB of storage capacity for the database application. The cloud services system then allocates 300 GB for the application. This on-demand capability enables users to avoid expenditures for processing and storage capacity that will most likely never be used.

However, in many cases, the determination of an application's capacity requirements constitutes merely a forecast of the application's maximum capacity made at the time the application and an associated virtual machine are first installed. The practice of requiring a user to specify a storage capacity requirement for an application at the time the application and associated virtual machine are first installed fails to take into account the probability that storage requirements will vary over the application's life cycle. In many cases, storage capacity is significantly over-provisioned in the beginning of the application's life (when the application has few users and/or has not yet generated and/or stored large quantities of data), and becomes under-provisioned at a later stage in the application's life cycle (as data accumulates and the allocated storage capacity becomes fully utilized).

Early in an application's life cycle, a user may be wasting resources and money if the processing and storage resources allocated to the application are under-utilized (and thus over-provisioned). Referring to the specific example introduced above, while the user may have 300 GB allocated for an application (and therefore is paying for 300 GB), at an early stage in the application's life cycle, the user may only be using 50 GB.

Later in an application's life-cycle, when the application's allocated storage capacity becomes fully utilized, it is often difficult, time-consuming, and costly to reconfigure the system to add more storage capacity. In existing cloud services systems, reconfiguring a cloud services system to increase an application's allocated storage capacity requires downtime and careful planning. Existing cloud services systems do not provide an easy mechanism for users to provision storage capacity on a need basis and to pay only for the storage capacity that is actually used.

For example, provisioning storage resources for a Logical Volume Manager (LVM) must be done manually by executing a series of commands (and therefore requires significant Linux expertise), and requires downtime. Furthermore, it is very difficult to reduce allocated storage capacity in a thin provisioned LVM.

In addition, in many cases different types of data require different types of treatment. Some data is accessed frequently, or is of high importance, and must be stored in a high-performance storage medium allowing instantaneous access, while other data may be rarely accessed, or is of low importance, and can be archived in a lower-performance storage medium. Furthermore, some types of data may have a life cycle that affects how often it is accessed. For example, some data is accessed frequently for a short time period after being stored, and then is rarely accessed later. It may be desirable to store such data initially in a high-performance storage medium, and in a lower-performance storage medium at a later time.

Many existing cloud service systems provide different types of storage media and allow a user to select the type of storage medium to be used to store the user's data. For example, a first class of storage devices may have higher performance characteristics while a second class of storage devices may have lower performance characteristics. Typically, a user may select the type of storage medium to be used at the time storage capacity is allocated for the user's application. However, existing cloud service systems do not enable a user to adjust the allocation of storage capacity among different types of storage media as the utilization of data evolves over time. A need exists for improved systems, apparatus and methods for allocating storage resources in a cloud service system.

Downtime can be particularly costly for many businesses and organizations. In many industries, business continuity is critical. As a result, there is a need for systems and methods that allow re-allocation of storage resources, and migration of data as necessary, without any downtime.

Developing systems, apparatus, and methods for re-allocating storage resources and migrating data within a cloud services system, without the need for downtime, requires a thorough knowledge of data storage devices, data storage systems, and data storage protocols. Such knowledge is typically held by traditional storage system vendors, who are not typically in the business of providing cloud services. Cloud service providers, on the other hand, typically are companies with experience providing Internet-related services, and do not typically have access to such knowledge, and therefore are not in a position to develop such solutions (and have not done so). For these and other reasons, systems, apparatus, and methods for re-allocating storage resources and migrating data within a cloud services system, without the need for downtime, have not been developed.

Systems, apparatus and methods for managing the allocation of storage resources in a cloud service system are provided herein. Advantageously, the systems, apparatus and methods described herein allow the allocation of storage resources in a cloud service system to be automatically adjusted, based on actual utilization of storage resources, without the need for downtime or interruption, and without the need for user input. Therefore, the systems, apparatus, and methods described herein provide novel improvements to the performance of a cloud services system.

FIG. 1 shows a system of resources that may be used in a cloud services system in accordance with an embodiment. A system of resources such as that shown in FIG. 1 may be maintained and/or controlled by a cloud services provider, for example.

System 100 includes a network 105, and a plurality of processing resources and a plurality of storage resources. In the illustrative embodiment, the plurality of processing resources includes a plurality of CPU resources 110-A, 110-B, 110-C, 110-D, 110-E, 110-F, etc., while the plurality of storage resources include a plurality of storage—class I resources 120-A, 120-B, 120-C, etc., and a plurality of storage—class II resources 130-A, 130-B, 130-C, etc. System 100 also includes a cloud manager 135.

Network 105 may include one or more of a number of different types of networks, such as, for example, an Internet, an intranet, a local area network (LAN), a wide area network (WAN), a Fibre Channel network, a storage area network (SAN), or a wireless network. Other networks may be used. Alternatively, network 105 may include a combination of different types of networks.

Each CPU resource 110 represents a predetermined amount of processing capacity. For example, each CPU resource 110 may be a central processing unit having a selected processing capacity. Alternatively, each CPU resource 110 may include a plurality of central processing units. In another embodiment, each CPU resource 110 may be a virtual central processing unit (Virtual CPU). While six CPU resources 110 are shown in FIG. 1, any number of CPU resources may be used in a system of cloud services resources.

System 100 includes a plurality of storage resources 120-A, 120-B, 120-C of a first class and a plurality of storage resources 130-A, 130-B, 130-C of a second class. Storage resources are differentiated by one or more selected characteristics, such as cost attributes, data life cycle attributes, and/or performance attributes. For example, storage—class I resources may be storage resources having a first cost characteristic (e.g., low cost) while storage—class II resources may be storage resources having a second cost characteristic (e.g., high cost). Alternatively, storage—class I resources may be storage resources associated with a first stage of a data life cycle (e.g., high, instantaneous availability) while storage—class II resources may be storage resources associated with a second stage of a data life cycle (e.g., low, delayed availability).

In the illustrative embodiment, storage—class I resources 120 are storage resources having a first set of performance characteristics, and storage—class II resources 130 are storage resources having a second set of performance characteristics (different from the first set of performance characteristics). In various embodiments, performance characteristics used to differentiate classes of storage may include latency (e.g., the time required for a storage device to respond to an I/O request), I/Os per second (IOPS), bandwidth (e.g., the amount of data that can be stored/retrieved by a storage device, per second), etc.

While only two classes of storage resources are illustrated in the Drawings, in other embodiments, a system of resources may include more than two classes of storage resources.

Thus, in the illustrative embodiment of FIG. 1, each storage—class I resource 120 represents a predetermined amount of storage capacity having a first set of performance characteristics. Similarly, each storage—class II resource 130 represents a predetermined amount of storage capacity having a second set of performance characteristics (different from the first set of performance characteristics). For example, each storage—class I resource 120 may represent a predetermined amount of storage capacity having a first, relatively low, bandwidth, while each storage—class II resource represents a predetermined amount of storage capacity having a second, relatively high, bandwidth. Each storage resource 120, 130 may include all of the storage capacity of a storage device, or a portion of the capacity of a storage device. For example, each storage resource 120, 130 may include all or a portion of the storage space on a hard disk drive, a solid state drive, a storage area network (SAN), a flash memory device, a tape drive, an optical storage device, or another type of storage device or system.

Cloud manager 135 provisions CPU resources 110, storage—class I resources 120 and storage—class II resources 130 to users. For example, cloud manager 135 may provision resources based on one or more predetermined policies. Cloud manager 135 is typically maintained and controlled by the cloud services provider.

CPU resources 110 and storage resources 120, 130 may be arranged in any suitable arrangement. For example, all CPU resources may reside in a single computer, or each CPU resource 110 may reside in a different respective computer. Similarly, all storage resources 120 and 130 may reside in a single storage device or storage system. Alternatively, each storage resource 120, 130 may reside in a different respective storage device or storage system.

Figure 2:
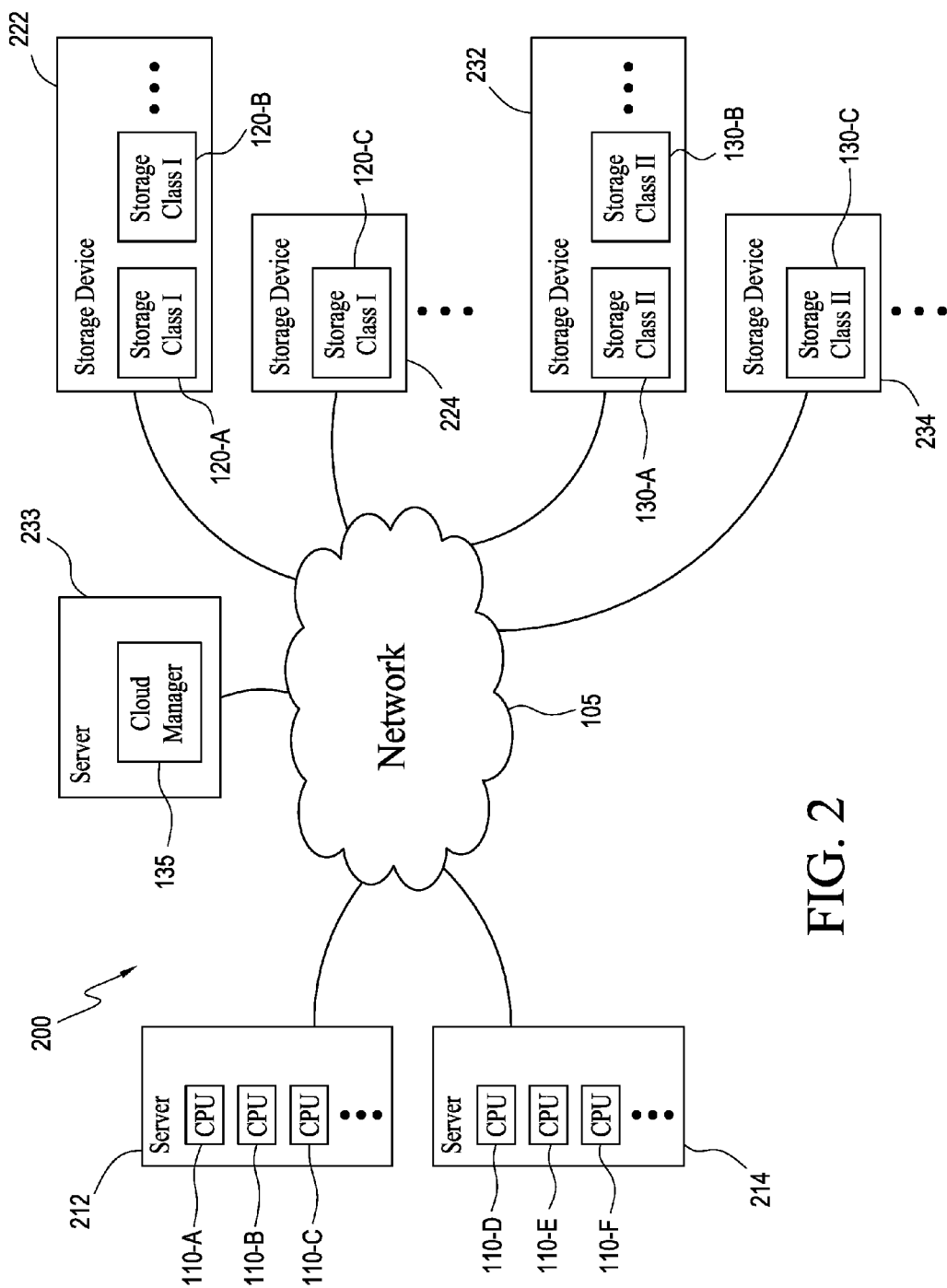
FIG. 2 shows a cloud services system including an arrangement of CPU resources and storage resources in accordance with an embodiment.

FIG. 2 shows a cloud services system including a possible arrangement of CPU resources and storage resources in accordance with an embodiment. Other arrangements may be used. In the illustrative embodiment, cloud services system 200 includes network 105, a first server 212, a second server 214, a third server 233, a first storage device 222, a second storage device 224, a third storage device 232, and a fourth storage device 234. Each of first server 212, second server 214, third server 233, first storage device 222, second storage device 224, third storage device 232, and fourth storage device 234 is connected to network 105, and communicates with other components via network 105. Each of first server 212, second server 214, and third server 233 may be a server computer or other processing device, for example.

CPU resources 110-A, 110-B, and 110-C reside in first server 212. CPU resources 110-D, 110-E, and 110-E reside in second server 214. First server 212 and second server 214 are connected to network 105.

Cloud manager 135 resides and operates in third server 233. Third server 233 is connected to network 105.

Storage—class I resources 120-A, 120-B reside and operate in storage device 222. Storage—class I resource 120-C resides and operates in storage device 224. For example, each storage device 222, 224 may be a disk drive capable of providing performance commensurate with the performance characteristics of storage—class I storage resources. In another embodiment, each storage device 222, 224 may include a storage system capable of providing performance commensurate with the performance characteristics of storage—class I storage resources. For example, each storage device 222, 224 may include a hard disk drive, a solid state drive, a storage area network (SAN), a flash memory device, a tape drive, an optical storage device, or another type of storage device or system.

Storage—class II resources 130-A, 130-B reside and operate in storage device 232. Storage—class II resource 130-C resides and operates in storage device 234. For example, each storage device 232, 234 may be a disk drive capable of providing performance commensurate with the performance characteristics of storage—class II storage resources. In another embodiment, each storage device 232, 234 may include a storage system capable of providing performance commensurate with the performance characteristics of storage—class II storage resources. For example, each storage device 222, 224 may include a hard disk drive, a solid state drive, a storage area network (SAN), a flash memory device, a tape drive, an optical storage device, or another type of storage device or system.

Figure 3:
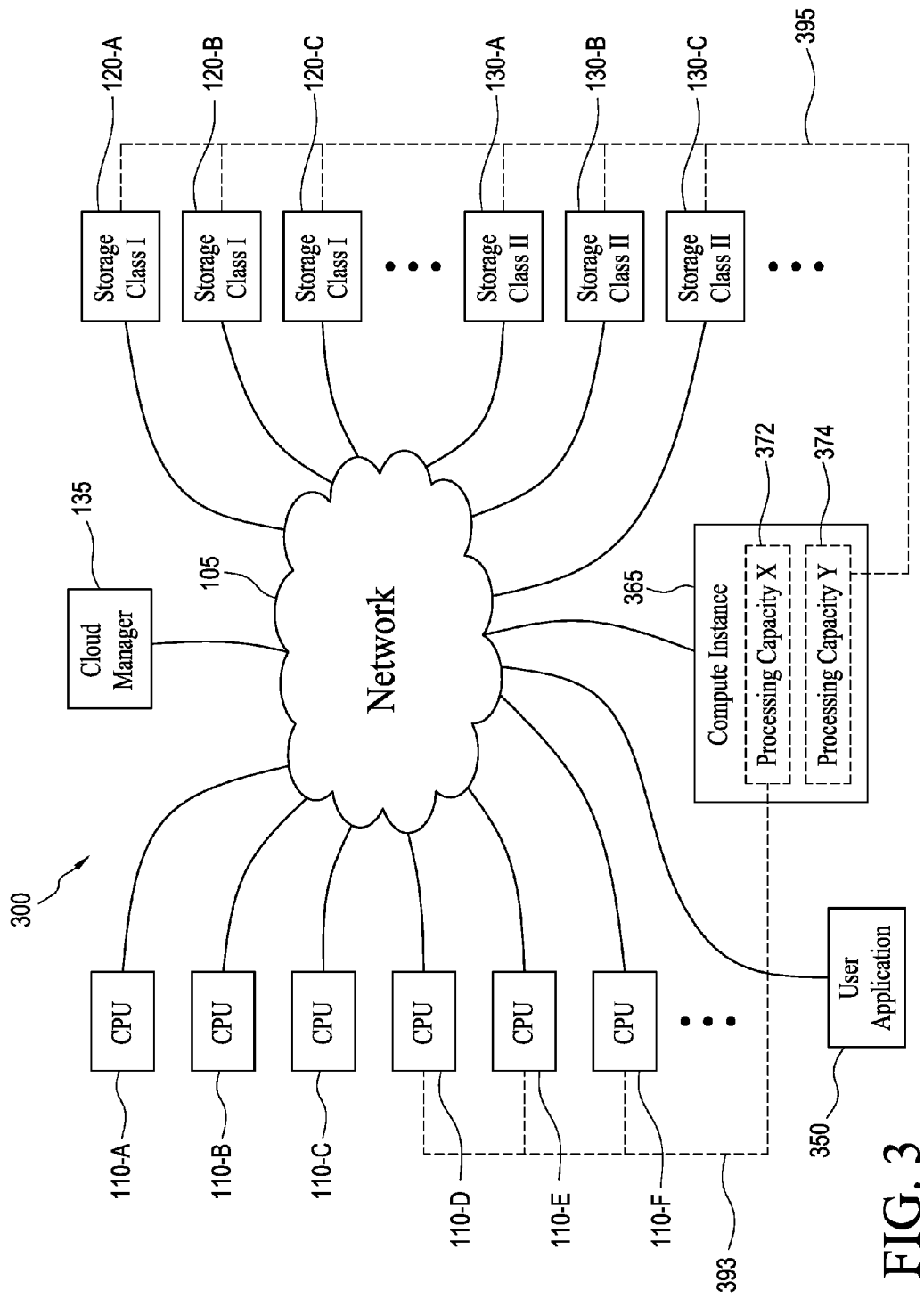
FIG. 3 shows components of a cloud service system in accordance with an embodiment.

FIG. 3 shows components of a cloud service system in accordance with an embodiment. Cloud service system 300 includes network 105, CPU resources 110, storage resources 120, 130, and cloud manager 135.

In the illustrative embodiment, a user application 350 communicates with cloud manager 135 via network 105. User application 350 may be any type of software application, such as a database, a webserver, a big data analytics application, etc. User application 350 stores data on storage resources 120 and/or storage resources 130. For example, in an illustrative example, user application 350 may be a data analytics application utilized by a customer or user. The data analytics application collects relevant data and stores the data in a database (maintained on storage resources 120 or on storage resources 130). The data analytics application subsequently reads data from the database, analyzes the data by applying various requirements and produces output in a particular format, which is stored in a separate database.

In one embodiment, user application 350 is software application provided by the cloud services system for use by a customer or user. In other embodiments, user application 350 is provided by the customer of the cloud services system, or by a third party. User application 350 typically runs on top of an operating system such as Linux, Windows, etc.

User application 350 submits to cloud manager 135 a request for a specified amount of processing capacity and a specified amount of storage capacity. In the illustrative embodiment, user application 350 requests an amount of processing capacity specified as X and an amount of storage capacity specified as Y. The user may also specify one or more desired performance characteristics for the storage capacity, including latency, IOPS, bandwidth, etc. In some embodiments, the user application may specify what type of storage is requested; for example, the request may specify that all of the storage capacity is to be class I, or may specify that all of the storage capacity is to be class II, or that a combination of class I storage and class II storage is desired.

Cloud manager 135 receives the request from user application 350 and, in response to the request, generates a compute instance. Cloud manager 135 also allocates CPU resources and storage resources to the compute instance based on the specified amount of processing capacity and the specified amount of storage capacity indicated by the request. In the illustrative embodiment FIG. 3, cloud manager 135 generates a compute instance 365 and allocates a processing capacity X (372) and a storage capacity Y (374) to compute instance 365.

In some embodiments, a cloud service provider may use server virtualization technologies to allocate virtual CPUs. Cloud services may be built on top of server virtualization. Server virtualization allows a physical computer to be used as one or more virtual machines and maximizes computer resource utilization. Server virtualization is achieved using a thin software layer hypervisor and appropriate hardware (CPUs, etc).

In some embodiments, storage virtualization technologies are used for provisioning storage resources. Storage virtualization allows consolidation of physical storage resources into virtual storage pools. Storage resources of any size are then allocated from the virtual storage pools. The storage resources are attached to CPU resources using virtualized networks.

In some embodiments, Application Programming Interface (API) enables third party developers to create a compute instance and storage resources. For example, in one embodiment, cloud manager 135 may call "aws createinstance" to create a compute instance. Additional parameters may be passed to other commands to specify CPU resources 110 and storage resources 120, 130.

Cloud manager 135 allocates a sufficient number of CPU resources 110 to compute instance 365 to provide the requested processing capacity X. After certain CPU resources 110 have been allocated to compute instance 365, compute instance 365 may access and utilize the allocated CPU resources. Referring to FIG. 3, allocations of CPU resources are represented by links 393. Thus, links 393 indicate that CPU resources 110-D, 110-E, and 110-F are allocated to compute instance 365. In the illustrative example, CPU resources 110-A, 110-B, and 110-C are not allocated to compute instance 365.

Similarly, cloud manager 135 allocates a sufficient number of storage resources 120, 130 to provide the requested storage capacity Y. If the user application requested a particular class of storage resources, cloud manager 135 complies with the request and allocates the requested type of storage resource to compute instance 365. After certain storage resources 120, 130 have been allocated to compute instance 365, compute instance 365 may access and utilize the allocated storage resources. Referring to FIG. 3, allocations of storage resources are indicated by links 395. Thus, links 395 indicate that storage resources 120-A, 120-B, 120-C, and 130-A, 130-B, and 130-C are allocated to compute instance 365.

Compute instance 365 is a virtual machine and appears to a user, and to user application 350, as a device or system having the specified amount of processing capacity and the specified amount of storage capacity and performance. Compute instance 365 is associated with user application 350. Accordingly, user application 350 may access compute instance and utilize the resources that are associated with compute instance 365. In some embodiments, compute instance 365 is constructed such that user application 350 resides and operates on compute instance 365.

Figure 4:
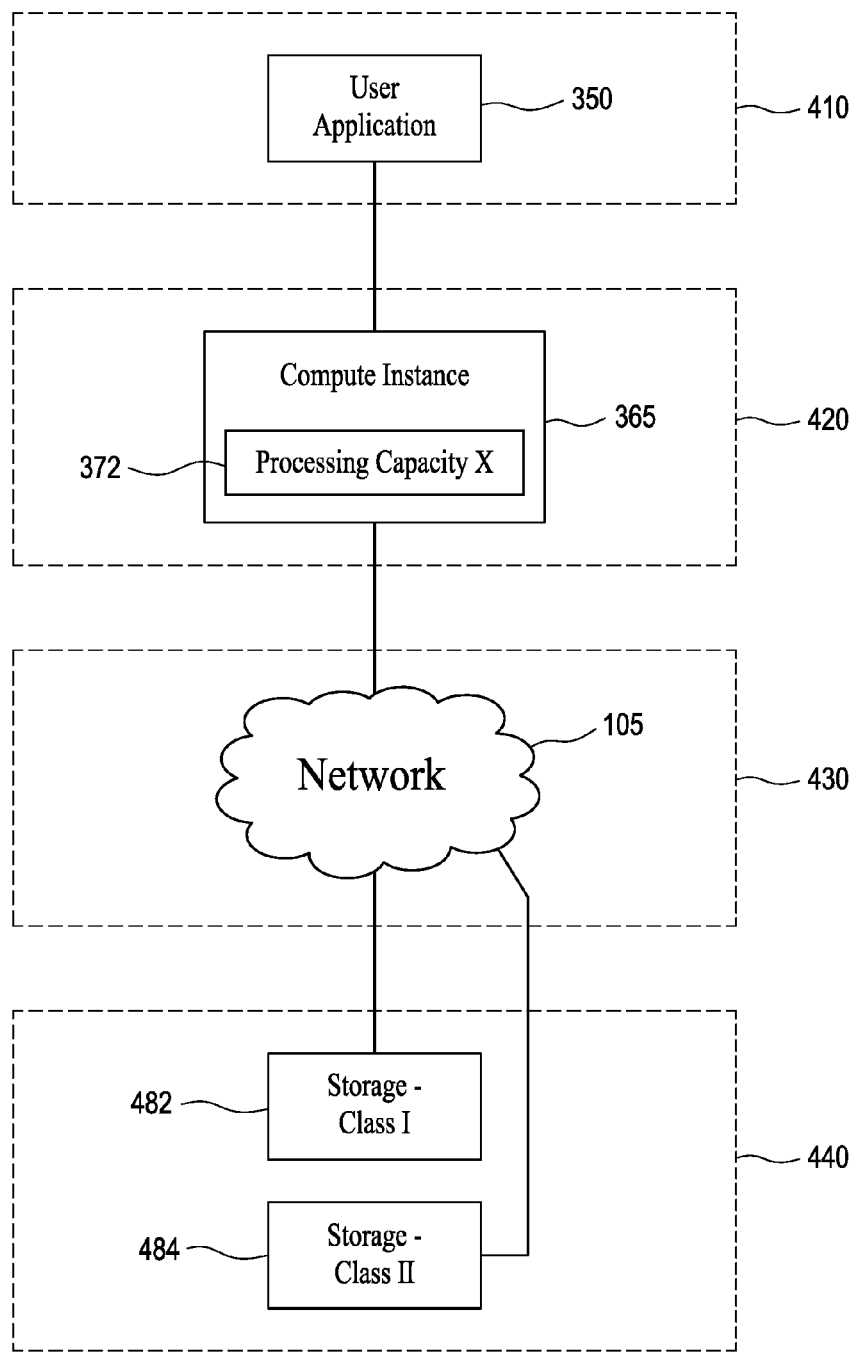
FIG. 4 illustrates layers of a cloud services system in accordance with an embodiment.

FIG. 4 illustrates logical layers of cloud services system 300. The layers illustrated in FIG. 4 may represent logical layers of cloud services system 300 as viewed by user application 350, for example. A first layer 410 includes user application 350. A second layer 420 includes compute instance 365, which includes processing capacity X (372). A third layer 430 includes network 105. A fourth layer 440 includes class I storage (482) and class II storage (484).

In accordance with an embodiment, a cloud services system includes an optimization module adapted to optimize the utilization of storage resources by a compute instance.

For this purpose, an agent is installed in the compute instance. The agent monitors utilization of storage resources by the compute instance. The agent collects storage resource utilization data and provides the information to the optimization module. The optimization module analyzes the utilization of storage resources by the compute instance and adjusts the allocation of storage resources to the compute instance based on one or more optimization policies.

In one embodiment, the customer or user installs the agent on the compute instance. In other embodiments, another entity or another component may install an agent on the compute instance.

Figure 5:
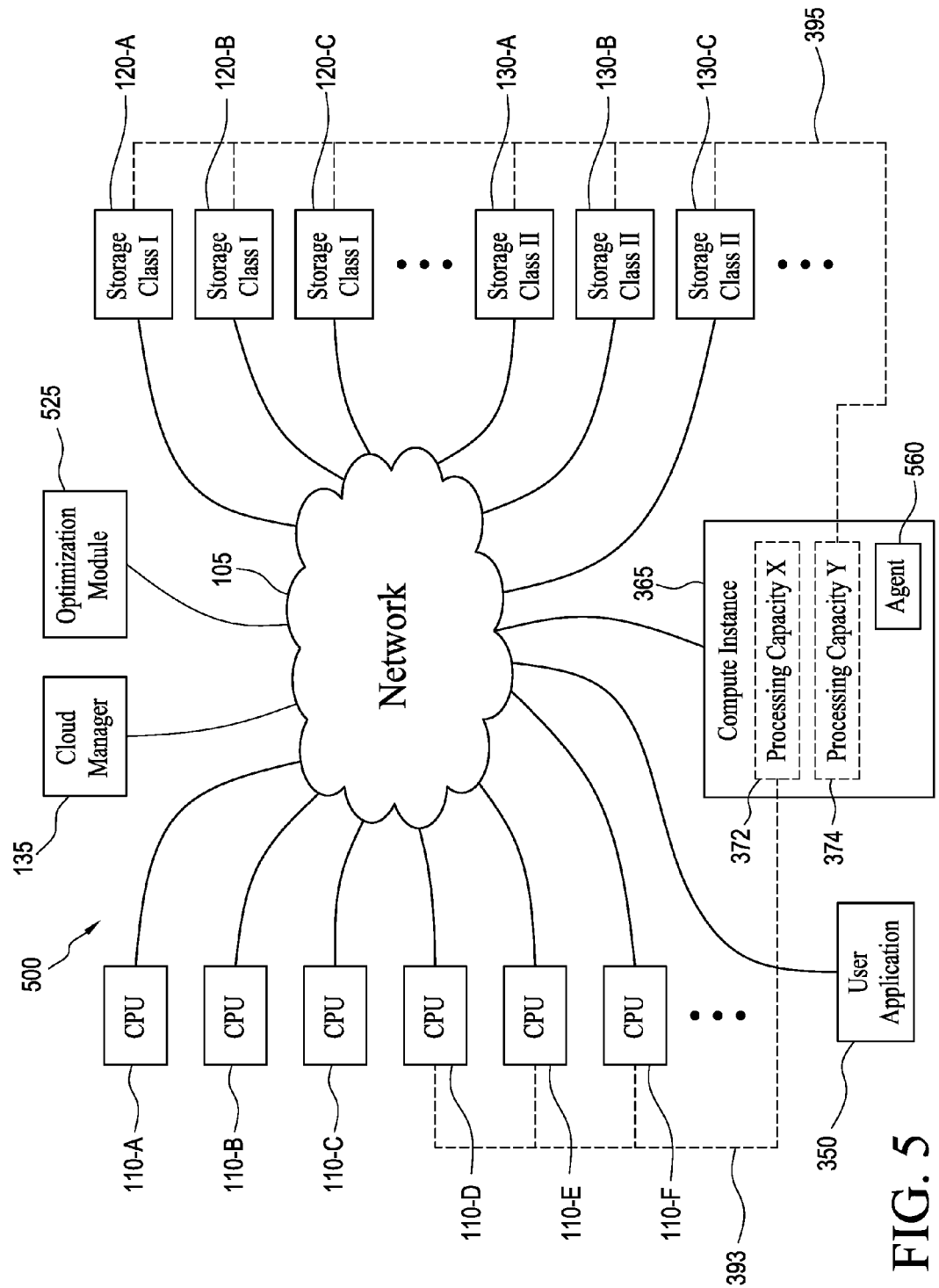
FIG. 5 shows a cloud services system in accordance with another embodiment.

FIG. 5 shows a cloud services system in accordance with another embodiment. Cloud services system includes network 105, CPU resources 110, storage resources 120, 130, user application 350, and compute instance 365. Cloud services system 500 also includes an optimization module 525.

Optimization module 525 collects information concerning utilization by a compute instance of storage resources allocated thereto, and may from time to time adjust the allocation of storage resources to optimize the utilization of resources. In order to facilitate the collection of storage resource utilization data, optimization module 525 communicates with the agent residing on a compute instance. Optimization module 525 may require registration of a compute instance prior to installation of an agent and collection of storage resource utilization data.

In other embodiments, an agent may be installed in a compute instance by cloud manager 135 or by another component. For example, cloud manager 135 may install an agent on the compute instance when the compute instance is created.

In the illustrative embodiment of FIG. 5, an agent 560 is installed in compute instance 365. Agent 560 monitors utilization of storage resources 120, 130 by compute instance 365. Agent 560 communicates with optimization module 525. In particular, agent 560 collects storage resource utilization data and provides the storage resource utilization data to optimization module 525. Storage resource utilization data may include data indicating or relating to allocated capacity, used capacity, and I/Os per second of storage resources 120, 130. Allocated capacity is the total capacity provisioned by the cloud service provider. Allocated capacity is typically measured in Gigabytes (GB), Terabytes (TB), or Petabytes (PB). Used capacity is space used by applications such as user applications to store data. Typically, applications use file systems (such as ext4, xfs, zfs on Linux, or NTFS on Windows) to organize and store data. Used capacity includes user data and the metadata overhead from file systems. I/Os per second measures the number of read/write I/O operations to storage resources. Higher IOPS are associated with storage resources with higher performance capability. Typically, magnetic disk systems may be associated with a few hundred IOPS per magnetic disk; solid state disks are associated with more than 10,000 IOPS.

Historical IOPS information is also collected from the agent. Historical IOPS information is used to determine whether a performance-based optimization action (i.e., an adjustment to the allocation of storage resources) is needed. For example, if the maximum IOPS utilization is below a predetermined limit over a selected period (e.g., a period of three (3) days), optimization module 525 may determine that a storage resource allocation adjustment may be required.

In accordance with an embodiment, optimization module 525 analyzes the utilization of storage resources by compute instance 365 and adjusts the amount and/or type of storage resources allocated to compute instance 365 based on one or more optimization policies. Advantageously, adjustments to the allocation of storage resource capacity and/or type are performed transparently and automatically, and without user input, in such a manner that neither the customer/user, nor user application 350, is aware of the adjustment(s).

As discussed above, CPU resources 110 and storage resources 120, 130 may be arranged in any suitable arrangement. Similarly, cloud manager 135, optimization module 525, user application 350, and compute instance 365 may be arranged in any suitable arrangement. For example, cloud manager 135, optimization module 525, user application 350, and compute instance 365 may reside and operate on a single computer. Alternatively, each of these components may reside and operate independently on a different respective computer.

Figure 6A:
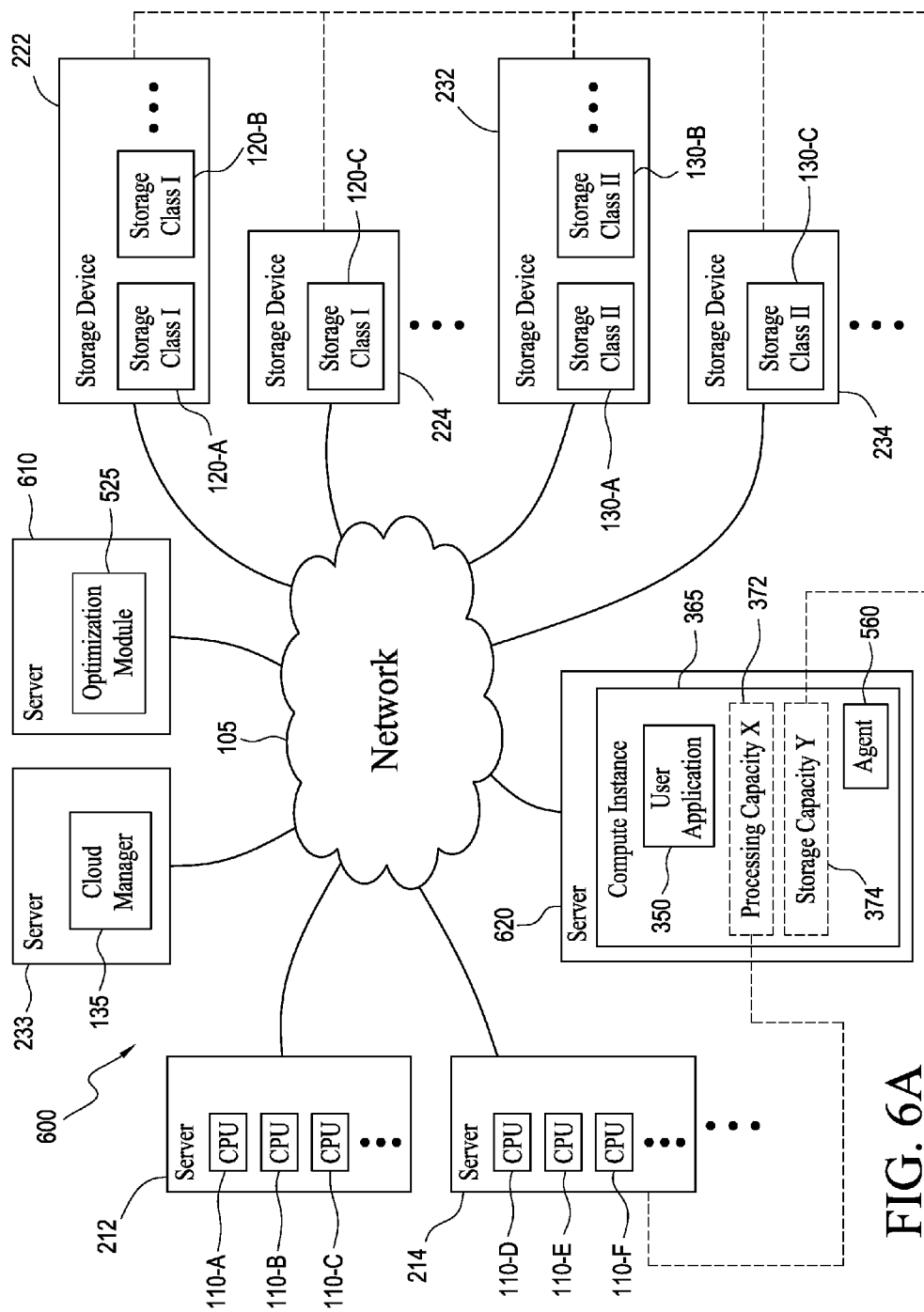
FIG. 6A shows an arrangement of CPU resources, storage resources, and other components of a cloud services system in accordance with an embodiment.

FIG. 6A shows an arrangement of CPU resources 110, storage resources 120, storage resources 130, cloud manager 135, optimization module 525, user application 350, and compute instance 365, in accordance with an embodiment. System 600 includes network 105, first server 212, second server 214, third server 233, first storage device 222, second storage device 224, third storage device 232, and fourth storage device 234. CPU resources 110 reside in first server 212 and second server 214. Storage resources 120 reside in storage devices 222, 224. Storage resources 130 reside in storage devices 232, 234. Cloud manager 233 resides in third server 233. User application 350 resides and operates in compute instance 365 and utilizes the processing and storage resources that are allocated to compute instance 365.

System 600 also includes a fourth server 610 and a fifth server 620, each of which is connected to network 105. Optimization module 525 resides and operates in fourth server 610. User application 350 and compute instance 365 reside in fifth server 620. Each of fourth server 610 and fifth server 620 may be a server computers or another type of processing device, for example.

In the illustrative embodiment of FIG. 6A, user application 350 runs on compute instance 365. In other embodiments, user application 350 runs separately from compute instance 365.

Figure 6B:
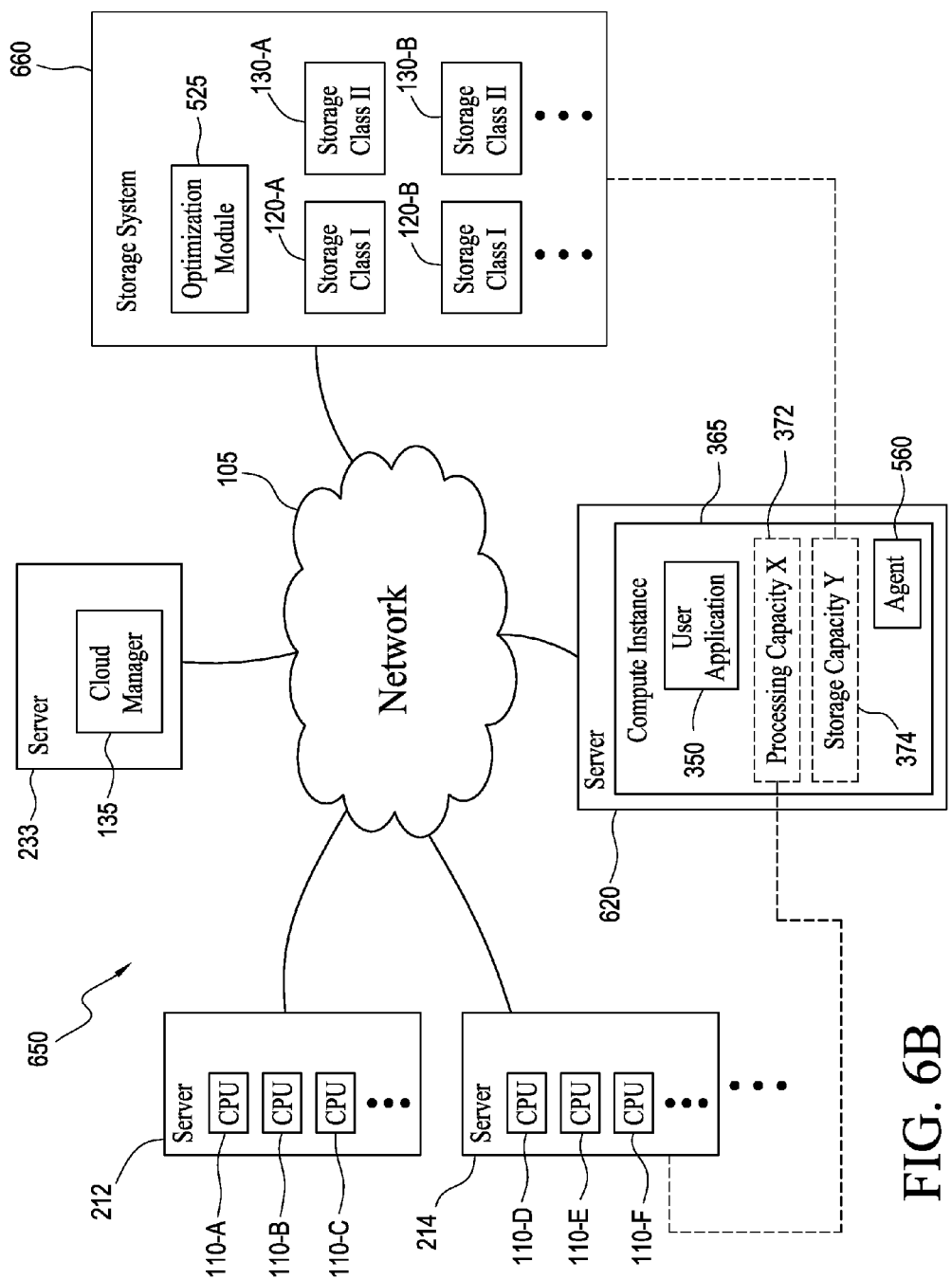
FIG. 6B shows an arrangement of CPU resources, storage resources, and other components of a cloud services system in accordance with another embodiment.

FIG. 6B shows an arrangement of CPU resources 110, storage resources 120, storage resources 130, cloud manager 135, optimization module 525, user application 350, and compute instance 365, in accordance with another embodiment. Cloud services system 650 includes network 105, first server 212, second server 214, third server 233, fourth server 610, and fifth server 620. Cloud services system 650 also includes a storage system 660 that is connected to network 105 and includes storage resources 120-A, 120-B, 130-A, and 130-B. Optimization module 525 resides and operates in storage system 660.

Figure 6C:
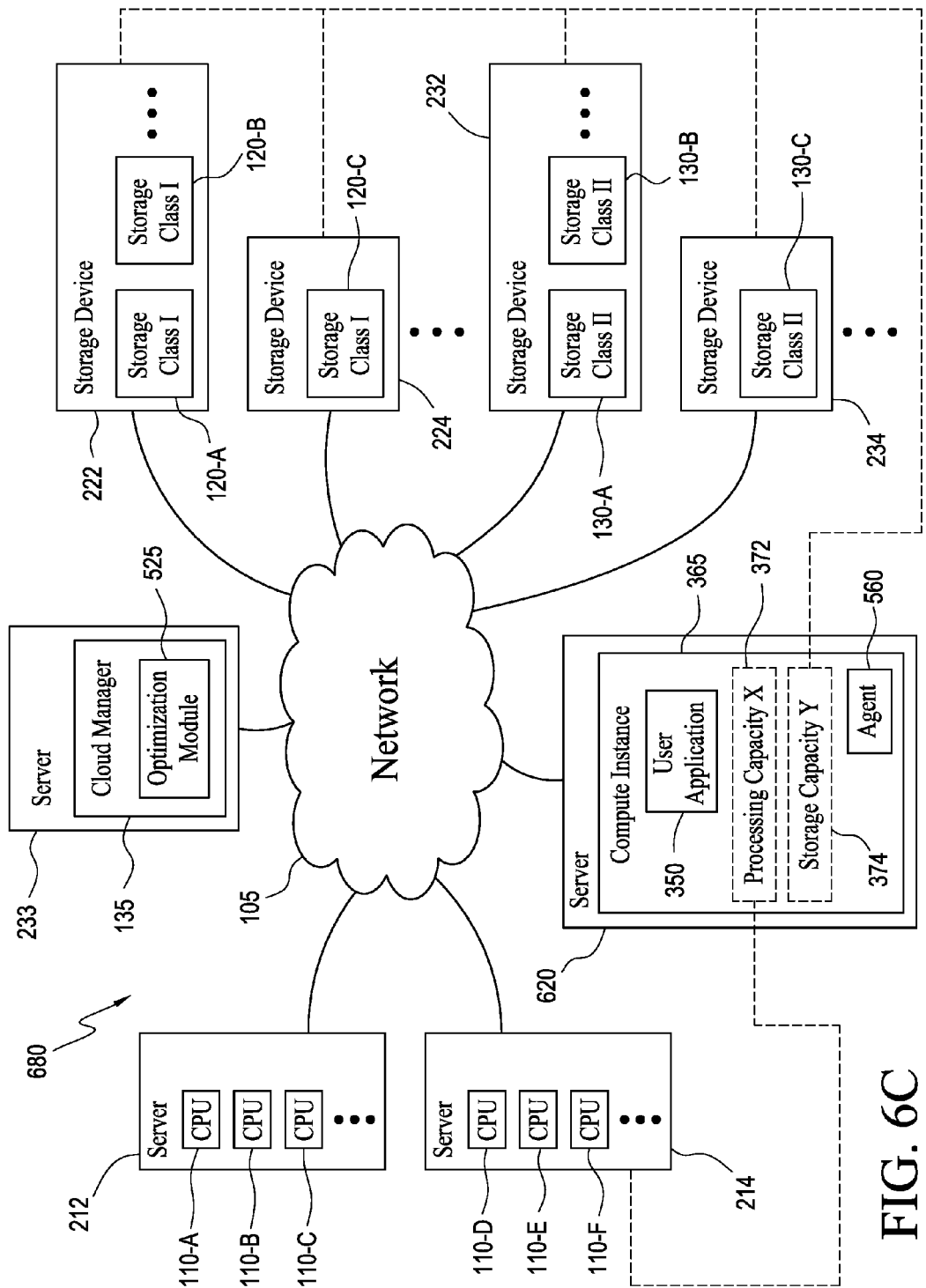
FIG. 6C shows an arrangement of CPU resources, storage resources, and other components of a cloud services system in accordance with another embodiment.

FIG. 6C shows an arrangement of CPU resources 110, storage resources 120, storage resources 130, cloud manager 135, optimization module 525, user application 350, and compute instance 365, in accordance with another embodiment. Cloud services system 680 is similar to system 600 of FIG. 6A; however, optimization module 525 resides and operates within cloud manager 135.

Figure 6D:
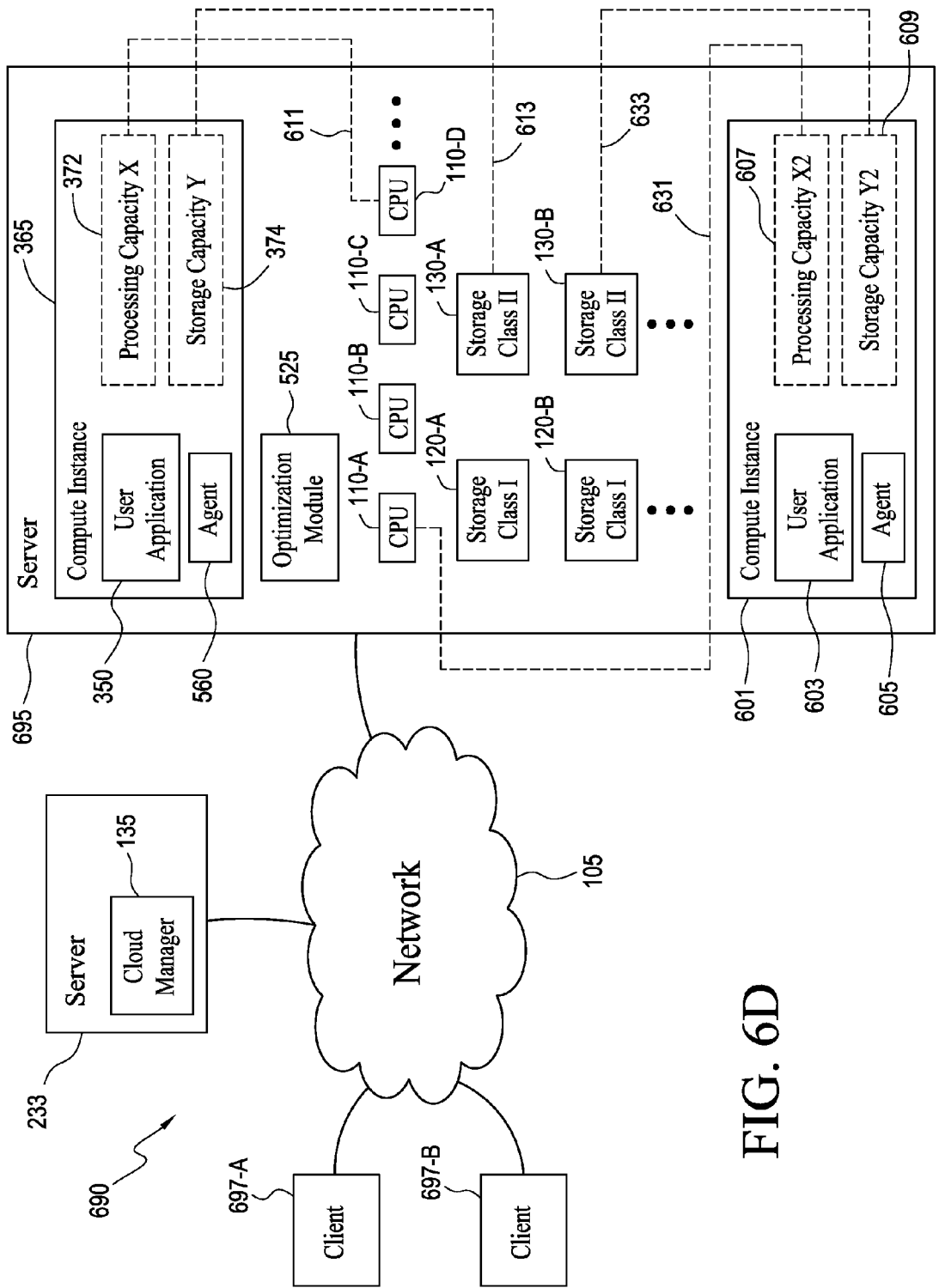
FIG. 6D shows an arrangement of CPU resources, storage resources, and other components of a cloud services system in accordance with another embodiment.

In another embodiment, components, including CPU resources, storage resources, an optimization component, and one or more compute instances (each having a respective agent component), reside in a single server computer or other processing device. Such an arrangement may be used to provide storage resources within a cloud services system, for example. FIG. 6D shows an arrangement of CPU resources 110, storage resources 120, storage resources 130, cloud manager 135, optimization module 525, user application 350, and compute instance 365, in accordance with another embodiment. A cloud services system 690 includes server 233 in which cloud manager 135 resides and operates. Cloud services system 690 also includes a server 695 which includes CPU resources 110, storage resources 120, storage resources 130, and optimization module 525. Cloud services system 690 further includes a plurality of clients including clients 697-A, 697-B, etc. Each client 697 may be a computer, a processing device, a software application, etc. Each respective client 697 utilizes a respective user application residing and operating in server 695. Cloud manager 135 creates a respective compute instance for each client.

Thus, in the illustrative embodiment, client 697-A utilizes user application 350, and cloud manager 135 generates compute instance 365 for client 697-A. Compute instance 365 resides and operates on server 695, and has processing capacity X (372) and storage capacity Y (374). User application 350 resides in compute instance 365 and uses the resources of compute instance 365. Cloud manager 135 allocates CPU resource 110-D and storage resource 130-A to compute instance 365. Agent 560 is installed on compute instance 365. In a manner similar to that described herein, optimization module 525 communicates with agent 560, collects and monitors storage resource utilization information relating to utilization by compute instance 365 of its storage resources, and may adjust the allocation of storage resources in order to optimize the utilization of such resources.

Similarly, client 697-B utilizes a user application 603 that resides and operates on server 695. Cloud manager 135 generates a compute instance 601 for client 697-A. Compute instance 601 resides and operates on server 695, and has processing capacity X2 (607) and storage capacity Y2 (609). User application 603 resides and operates in compute instance 601 and uses the resources of compute instance 601. Cloud manager 135 allocates CPU resource 110-A and storage resource 130-B to compute instance 601. An agent 605 is installed on compute instance 601. In a manner similar to that described herein, optimization module 525 communicates with agent 605, collects and monitors storage resource utilization information relating to utilization by compute instance 601 of its storage resources, and may adjust the allocation of storage resources in order to optimize the utilization of such resources.

Figure 7A:
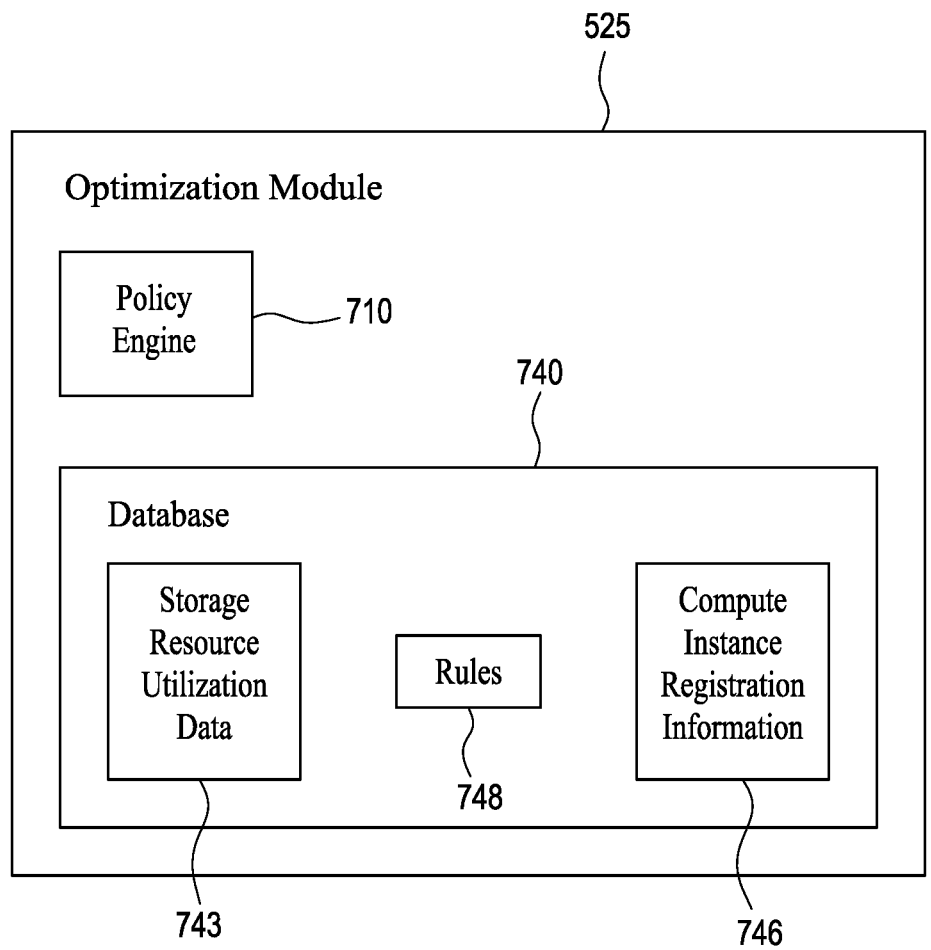
FIG. 7A shows components of an optimization module in accordance with an embodiment.

FIG. 7A shows components of optimization module 525 in accordance with an embodiment. Optimization module 525 includes a policy engine 710 and a database 740.

Database 740 stores various types of data. In other embodiments, optimization module 525 may store data in other forms and using other techniques. For example, data may be stored in the form of files or objects.

Registration information for various compute instances is stored as compute instance registration information 746. Thus, optimization module 525 maintains information for each compute instance that it is currently monitoring.

Storage resource utilization data relating to various compute instances is stored as storage resource utilization data 743. Thus, when optimization module 525 receives storage resource utilization data from agent 560, the storage resource utilization data is stored in database 740.

Policy engine 710 applies one or more predetermined rules to the storage resource utilization data obtained from agent 560 to determine whether or not storage resources currently allocated to a compute instance are over-allocated or under-allocated, and/or if a different class or type of storage resource should be allocated to the compute instance. Rules may be established by an administrator or other person or entity, for example. In the illustrative embodiment of FIG. 7A, rules are stored in database 740 as rules 748. Advantageously, because rules are stored within database 740 (and separately from policy engine 710), the rules may be modified independently of policy engine 710. In another embodiment, rules may be contained within policy engine 710 itself.

The rules applied by policy engine 710 may reflect any goals or priorities desired by an administrator, manager, owner or other entity. Rules may be few or numerous. For example, in one embodiment, rules may be established to reduce costs associated with data storage. In another embodiment, rules may be established to prioritize access to certain types of data over access to other types of data. In another embodiment, rules may be established to optimize the security of certain data. In another embodiment, rules may be established to maximize safety and redundancy of data. Several examples of rules that may be used are described herein; however, these examples are illustrative only and are not limiting.

In some embodiments, a user may provide input that is then used to define certain rules. For example, a user may specify a percentage of allocated storage capacity to be used to determine whether or not storage capacity is overallocated. Similarly, a user may specify a threshold to be used to determine if storage capacity is underallocated. Other criteria may be specified by a user.

Advantageously, during operation, policy engine 710 analyzes storage resource utilization data, applies rules to the storage resource utilization data, and makes determinations as to underallocation of resources, overallocation of resources, etc., in a transparent manner and without user input. Such analysis and determinations are made transparently and automatically, in such a manner that neither the customer user, nor user application 350, is aware of the analysis or of any determination resulting from the analysis.

Figure 7B:
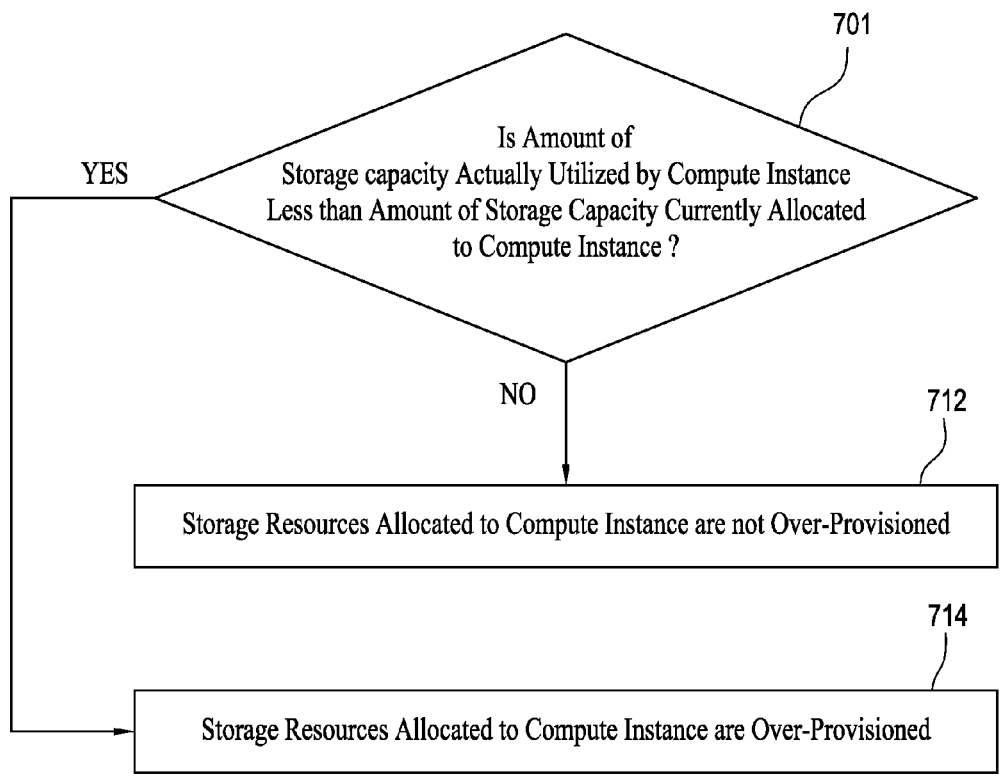
FIG. 7B illustrates a set of rules that may be applied to storage resource utilization data in accordance with an embodiment.

FIG. 7B illustrates an example of a set of rules that may be applied to storage resource utilization data in accordance with an embodiment. Policy engine 710 may access these rules and apply the rules to the storage resource utilization data 743. At block 701, a determination is made whether the amount of storage capacity actually utilized by a compute instance is less than the storage capacity currently allocated to the compute instance. Referring to block 712, if the storage capacity actually utilized by a compute instance is not less than the storage capacity currently allocated to the compute instance, the policy engine 710 determines that the storage resources allocated to the compute instance are not over-provisioned. Referring to block 714, if the storage capacity actually utilized by a compute instance is less than the storage capacity currently allocated to the compute instance, the policy engine 710 determines that the storage resources allocated to the compute instance are over-provisioned.

Figure 7C:
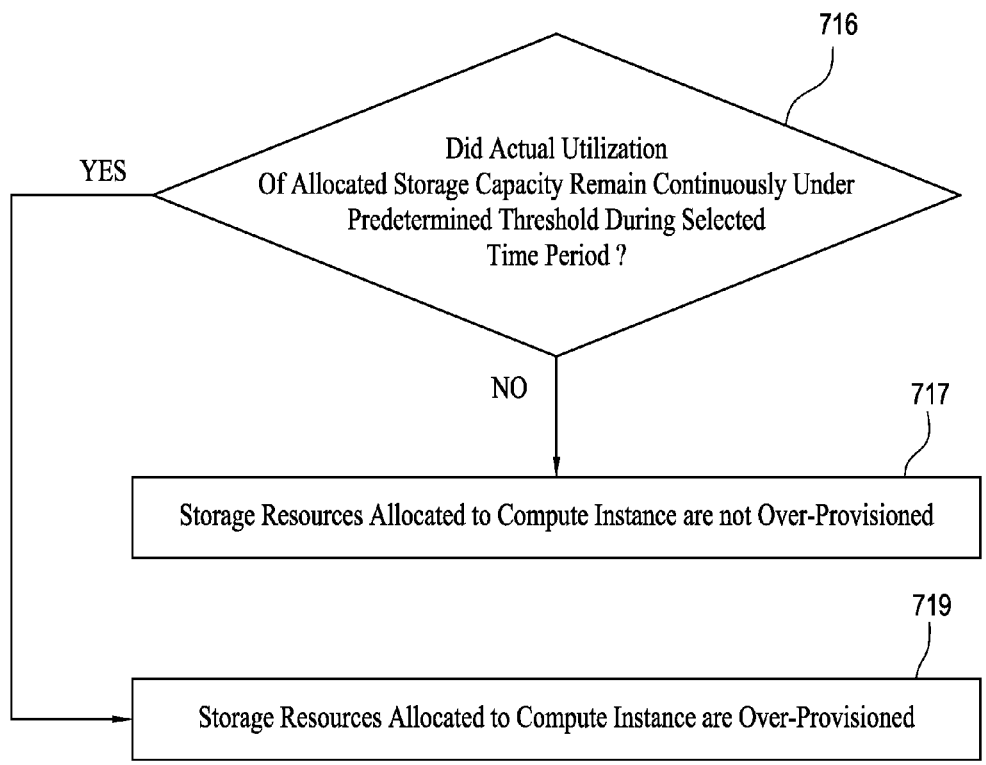
FIG. 7C illustrates a set of rules that may be applied to storage resource utilization data in accordance with another embodiment.

FIG. 7C illustrates an example of a set of rules that may be applied to storage resource utilization data in accordance with another embodiment. Policy engine 710 may access these rules and apply the rules to the storage resource utilization data 743. Policy engine 710 continually examines storage resource utilization for a selected time period (e.g., the past three (3) days). At block 716, a determination is made whether actual utilization of storage capacity during the selected time period (e.g., the past three (3) days) remained continuously under a predetermined threshold. Referring to block 717, if the actual utilization of storage capacity during the selected time period did not remain continuously under a predetermined threshold (i.e., if actual utilization exceeded the threshold at least once), policy engine 710 determines that the storage resources allocated to the compute instance are not over-provisioned. Referring to block 719, if actual utilization of storage capacity during the selected time period remained continuously under the predetermined threshold, policy engine 710 determines that the storage resources allocated to the compute instance are over-provisioned. The selected time period and the threshold may be selected by the customer or user, or may be selected automatically or by default. Any time period may be used. For example, a threshold in the range of 5%-10% of allocated storage capacity may be used as the predetermined threshold. Other thresholds may be used.

Figure 7D:
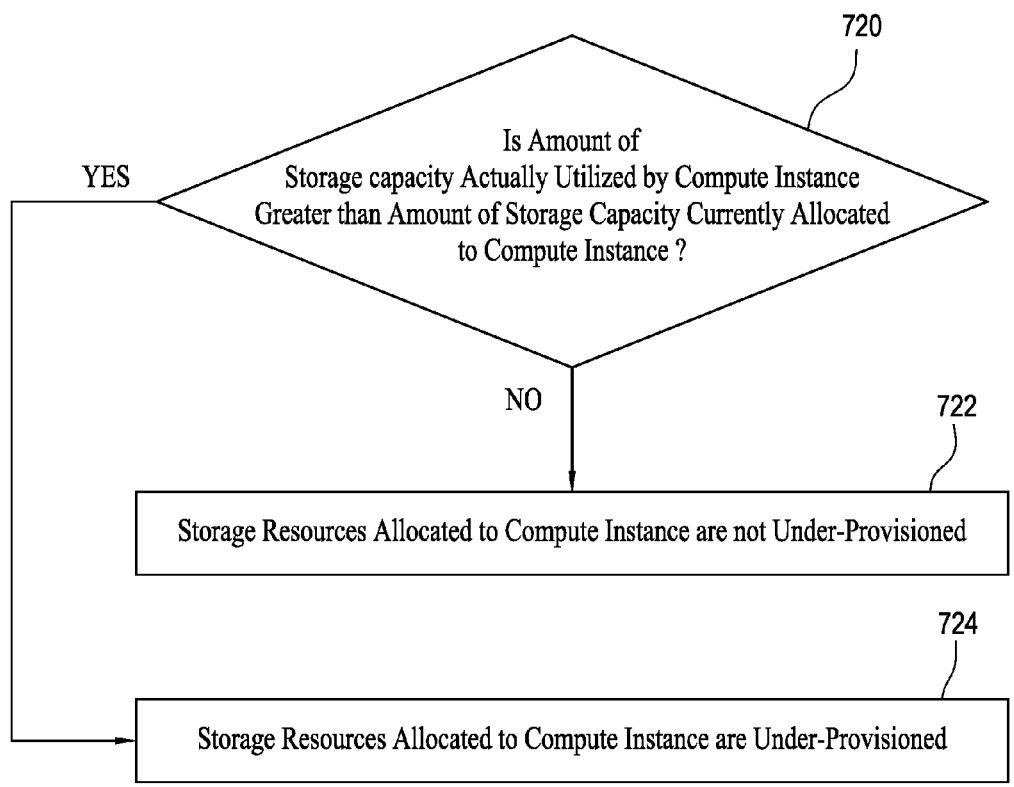
FIG. 7D illustrates a set of rules that may be applied to storage resource utilization data in accordance with another embodiment.

FIG. 7D illustrates another set of rules that may be applied to storage resource utilization data in accordance with an embodiment. Policy engine 710 may access these rules and apply the rules to the storage resource utilization data 743. At block 720, a determination is made whether the amount of storage capacity actually utilized by a compute instance is greater than the storage capacity currently allocated to the compute instance. Referring to block 722, if the storage capacity actually utilized by a compute instance is not greater than the storage capacity currently allocated to the compute instance, the policy engine 710 determines that the storage resources allocated to the compute instance are not under-provisioned. Referring to block 724, if the storage capacity actually utilized by a compute instance is greater than the storage capacity currently allocated to the compute instance, the policy engine 710 determines that the storage resources allocated to the compute instance are under-provisioned.

Figure 7E:
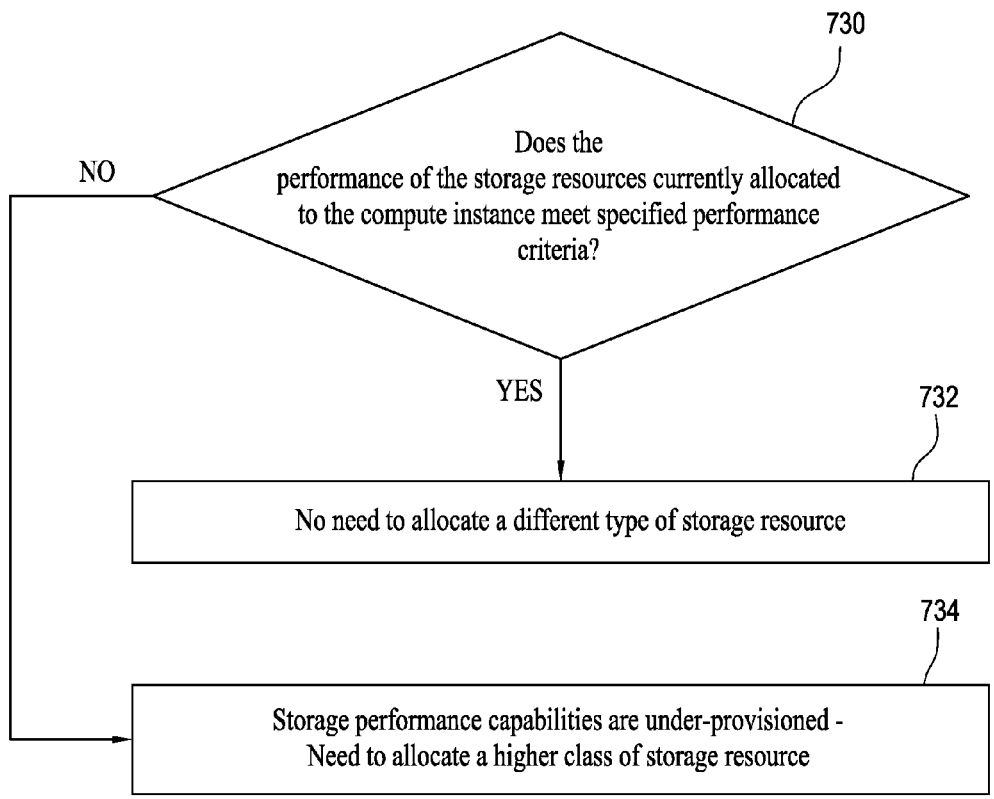
FIG. 7E illustrates a set of rules that may be applied to storage resource utilization data in accordance with another embodiment.

FIG. 7E illustrates another set of rules that may be applied to storage resource utilization data in accordance with an embodiment. For example, policy engine 710 may access these rules and apply the rules to storage resource utilization data collected for a particular compute instance. At block 730, a determination is made whether the performance of the storage resources currently allocated to a compute instance meets specified performance criteria. For example, policy engine 710 may examine the storage resource utilization data and determine whether the latency demonstrated by the currently allocated storage resources meet a latency requirement (e.g., the latency requirement specified by the user application in the request for a compute instance). Alternatively, policy engine 710 may determine whether the IOPS demonstrated by the currently allocated storage resources meet an IOPS requirement (e.g., the IOPS requirement specified by the user application in the request for a compute instance). Alternatively, policy engine 710 may determine whether the bandwidth demonstrated by the currently allocated storage resources meet a bandwidth requirement (e.g., the bandwidth requirement specified by the user application in the request for a compute instance). Referring to block 732, if the performance of the currently allocated storage resources meets the performance requirement, policy engine 710 determines that there is no need to allocate a different type of storage resource. Referring to block 734, if the performance of the currently allocated resources does not meet the performance requirement, policy engine 710 determines that storage performance capabilities are under-provisioned, and that there is a need to allocate a higher class of storage resource. As used herein, the term "higher class of storage resources" signifies a type or class of storage resources with improved performance characteristics relative to those of the currently allocated storage resources. For example, supposing that the storage resources currently allocated to a particular compute instance include one or more Class I storage resources (and no Class II resources), policy engine 710 may determine that one or more new Class II storage resources should be allocated to the compute instance and that some or all of the data currently stored in Class I storage resources should be migrated to the new Class II storage resources.

Figure 7F:
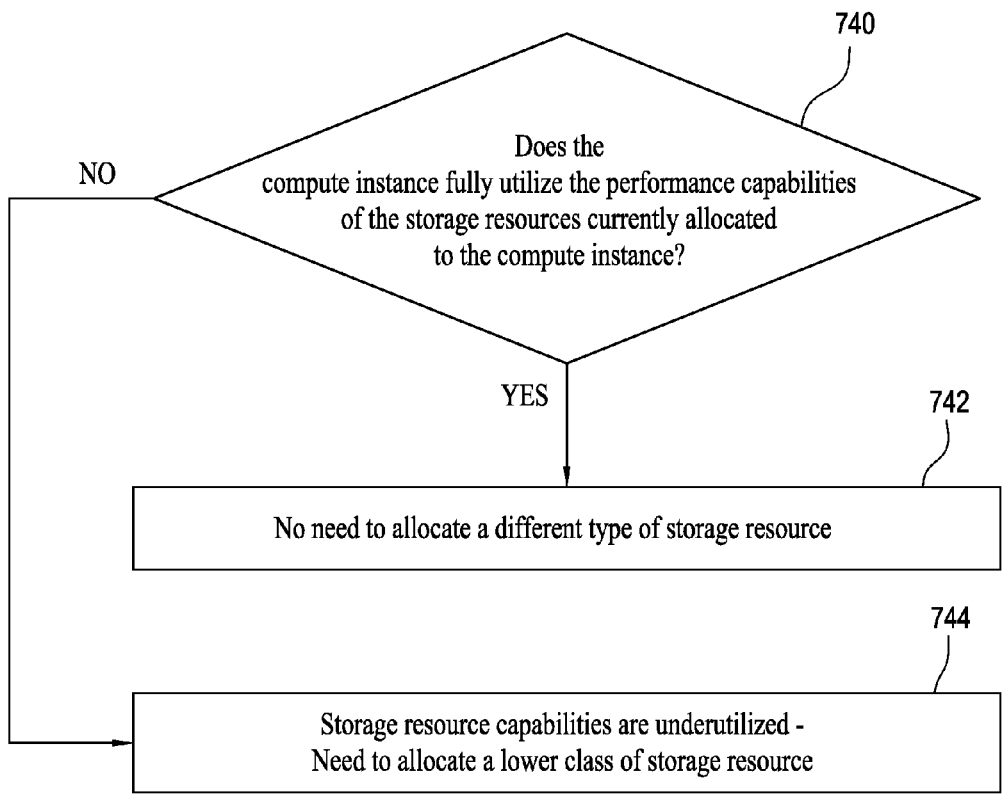
FIG. 7F illustrates a set of rules that may be applied to storage resource utilization data in accordance with another embodiment.

FIG. 7F illustrates another set of rules that may be applied to storage resource utilization data in accordance with an embodiment. Policy engine 710 may access these rules and apply the rules to the storage resource utilization data associated with a particular compute instance. At block 740, a determination is made whether or not the compute instance fully utilizes the performance capabilities of the storage resources currently allocated to the compute instance. Referring to block 742, if the compute instance fully utilizes the performance capabilities of the allocated storage resources, policy engine 710 determines that the performance capabilities of the currently allocated resources are not under-utilized (and therefore not over-provisioned), and that there is no need to allocate a different type of storage resource. Referring to block 744, if the compute instance does not fully utilize the performance capabilities of the allocated storage resources, policy engine 710 determines that the performance capabilities of the currently allocated resources are underutilized by the compute instance (and are therefore over-provisioned), and that there is a need to allocate a lower class of storage resource. In this particular example, the term "lower class of storage resources" signifies a type or class of storage resources with lower performance characteristics relative to those of the currently allocated storage resources. For example, policy engine 710 may determine that the latency capabilities of the currently allocated storage resources are underutilized by the compute instance. Alternatively, policy engine 710 may determine that the IOPS capabilities of the currently allocated storage resources are underutilized by the compute instance. Alternatively, policy engine 710 may determine that the bandwidth capabilities of the currently allocated storage resources are underutilized by the compute instance. For example, supposing that a compute instance is currently storing some or all data in one or more Class II storage resources, policy engine 710 may determine that the Class II storage resources are underutilized and that new Class I storage resources should be allocated to the compute instance. Policy engine 710 may further determine that some or all of the data currently stored in Class II storage resources should be migrated to the new Class I storage resources.

In other embodiments, rules intended to reduce the costs associated with data storage may be defined. Such rules may be defined by a user, by an administrator, or by default. For example, a rule may specify that if a high-cost data resource allocated to a compute instance receives less than a predetermined number of I/O requests, then the storage resources are over-allocated, and a lower-cost storage resource should be allocated and the data should be migrated to the lower-cost storage resource.

Figure 7G:
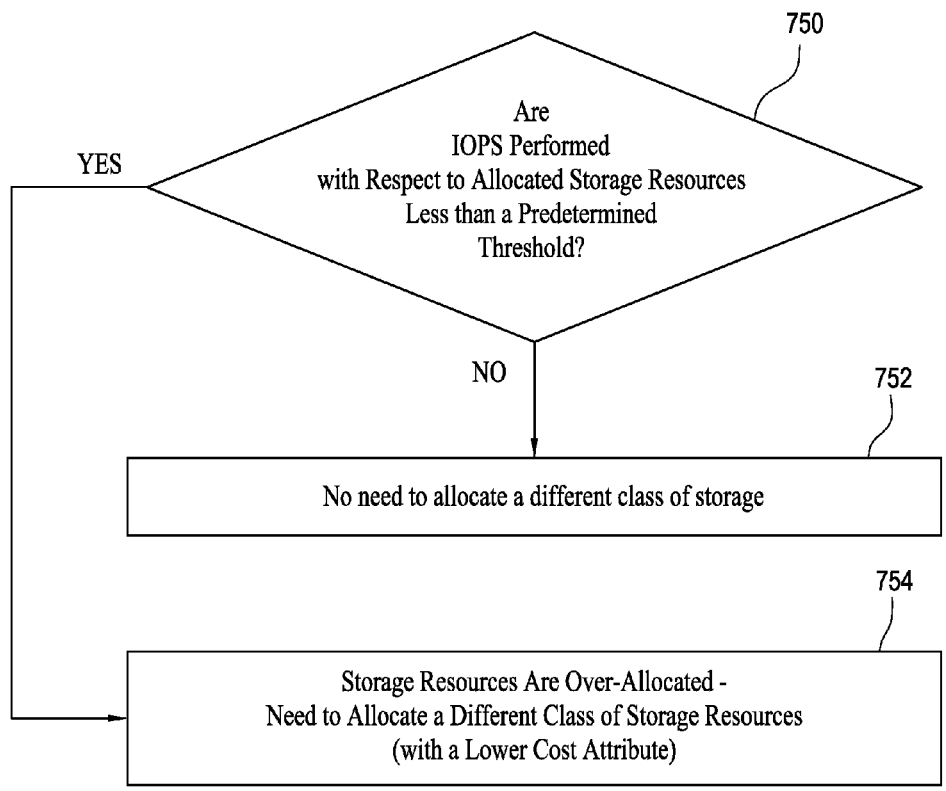
FIG. 7G illustrates a set of rules that may be applied to storage resource utilization data in accordance with another embodiment.

FIG. 7G illustrates a set of rules that may be applied to storage resource utilization data in accordance with another embodiment. For example, policy engine 710 may access these rules and apply the rules to storage resource utilization data collected for a particular compute instance. Referring to block 750, if policy engine 710 determines that the IOPS performed with respect to allocated storage resources are equal to or above (i.e., not less than) a predetermined threshold, then, in accordance with step 752, policy engine 710 determines that there is no need to allocate a different class of storage resources. However, if policy engine 710 determines that the IOPS performed with respect to allocated storage resources are less than the predetermined threshold, then the routine proceeds to step 754. At step 754, policy engine 710 determines that storage resources are over-allocated, and that there is therefore a need to allocate a different class of storage resources. For example, a class of storage resources having a lower cost attribute may be allocated.

In another embodiment, rules intended to address the expected life cycle of stored data may be defined. Such rules may be defined by a user, by an administrator, or by default. Supposing, for example, that a particular user application runs on a particular compute instance to which a high-performance storage resource is initially allocated, a rule may specify that after a predetermined period (e.g., one year), a lower-performance storage resource should be allocated, and the data stored in the higher-performance storage resource should be migrated to the lower-performance storage resource, and that the higher-performance storage resource should then be de-allocated.

Figure 7H:
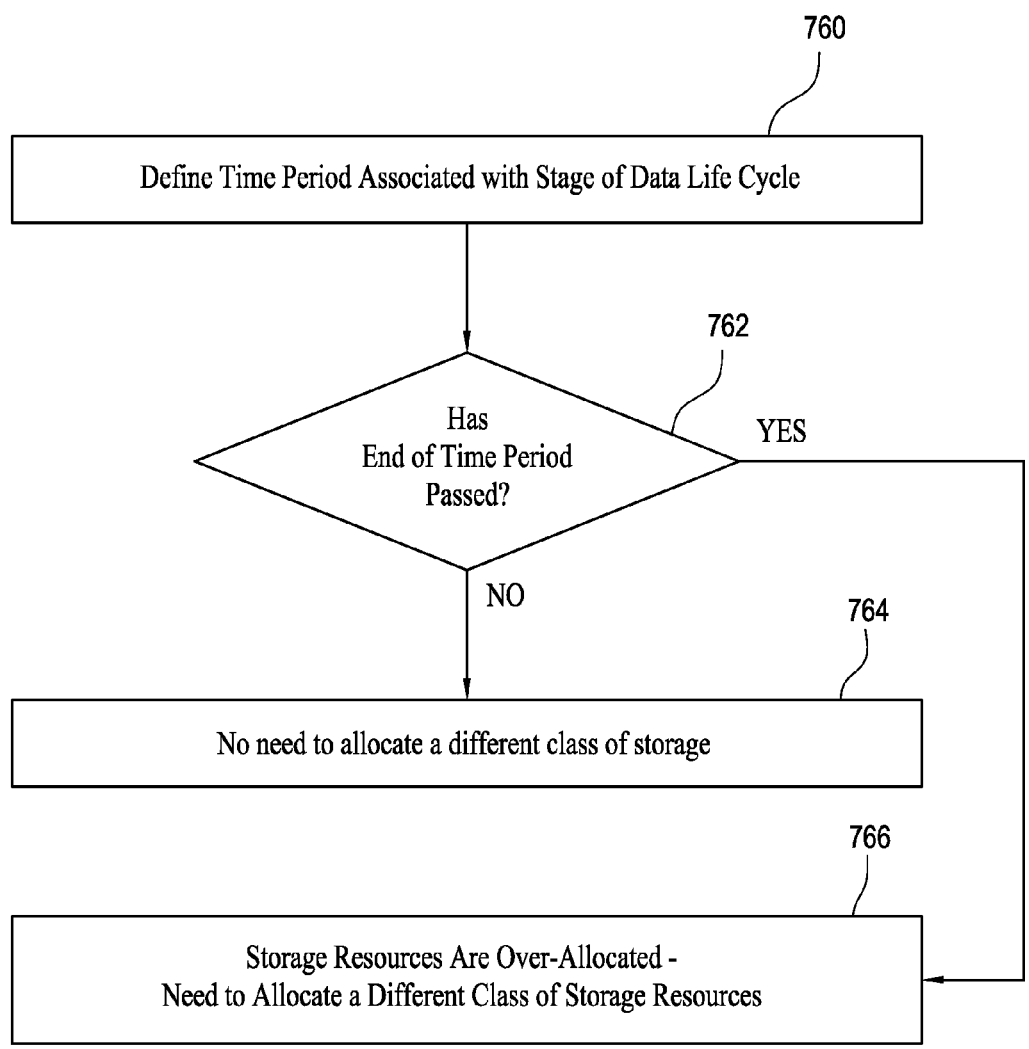
FIG. 7H illustrates a set of rules that may be applied to storage resource utilization data in accordance with another embodiment.

FIG. 7H illustrates a set of rules that may be applied to storage resource utilization data in accordance with another embodiment. For example, policy engine 710 may access these rules and apply the rules to storage resource utilization data collected for a particular compute instance. At step 760, a time period associated with a selected stage of a data life cycle is defined. For example, an administrator may predict that data maintained in a database will be frequently accessed for a period of two years, and then, after that time period ends, the data will be accessed less frequently. Therefore, a two-year time period associated with this stage of the data's life cycle may be defined. Referring to block 762, if the end of the time period has not yet passed, then the routine proceeds to step 764, and policy engine 710 determines that there is no need to allocate a different class of storage. If the end of the defined time period has passed, then the routine proceeds to step 766. At step 766, policy engine 710 determines that storage resources are over-allocated and that there is a need to allocate a different class of storage resources. For example, a class of storage resources having lower performance characteristics and/or a lower cost attribute may be allocated.

Figure 8:
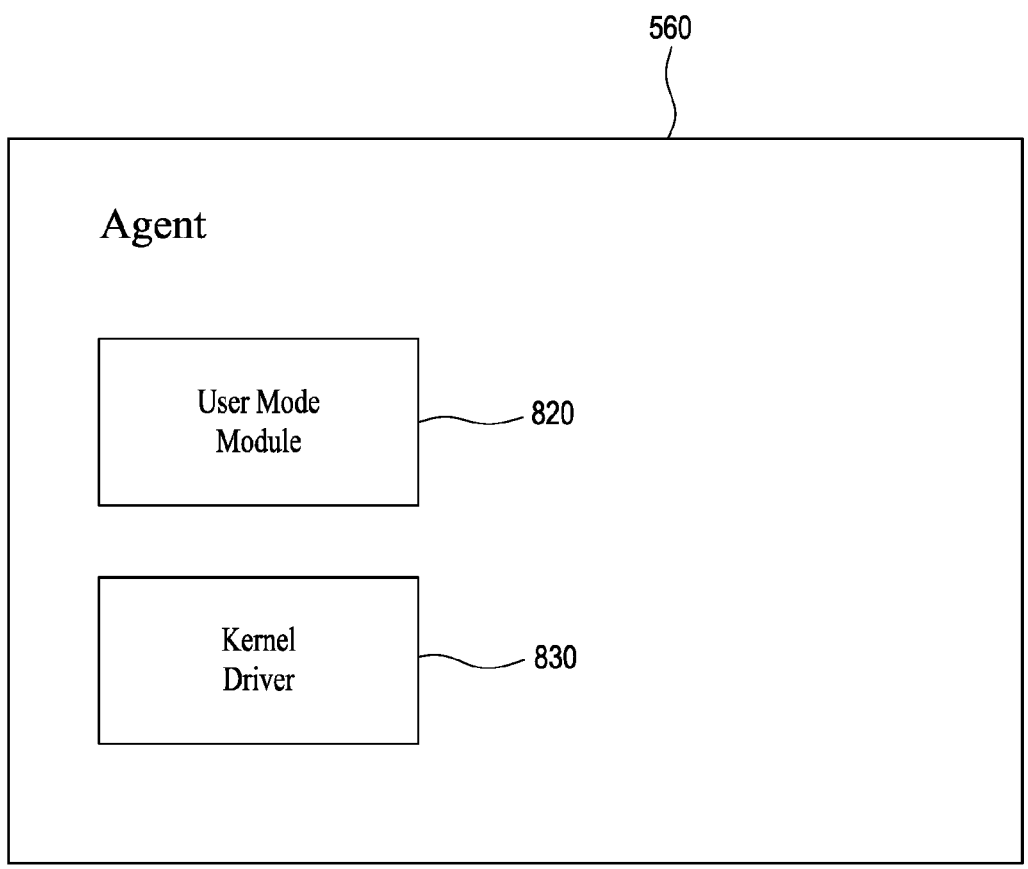
FIG. 8 shows components of an agent in accordance with an embodiment.

FIG. 8 shows components of agent 560 in accordance with an embodiment. Agent 560 includes a user mode module 820 and a kernel driver 830. User mode module 820 collects information by interacting with various operating system components and communicates with optimization module 525. User module 820 may also from time to time receive from optimization module 525 a commands to switch storage resources and passes the request on to kernel driver 830. Kernel driver 830 performs various functions including migrating data from one storage resource to another (in a transparent manner) and maintaining a logical view of storage resources regardless of the physical storage resources that are provisioned. Kernel driver 830 also maintains a logical view by maintaining a mapping of the logical view of resources to the physical resources. Kernel driver 830 also sends requests to optimization module 525 to allocate additional storage resources when necessary.

Figure 9A:
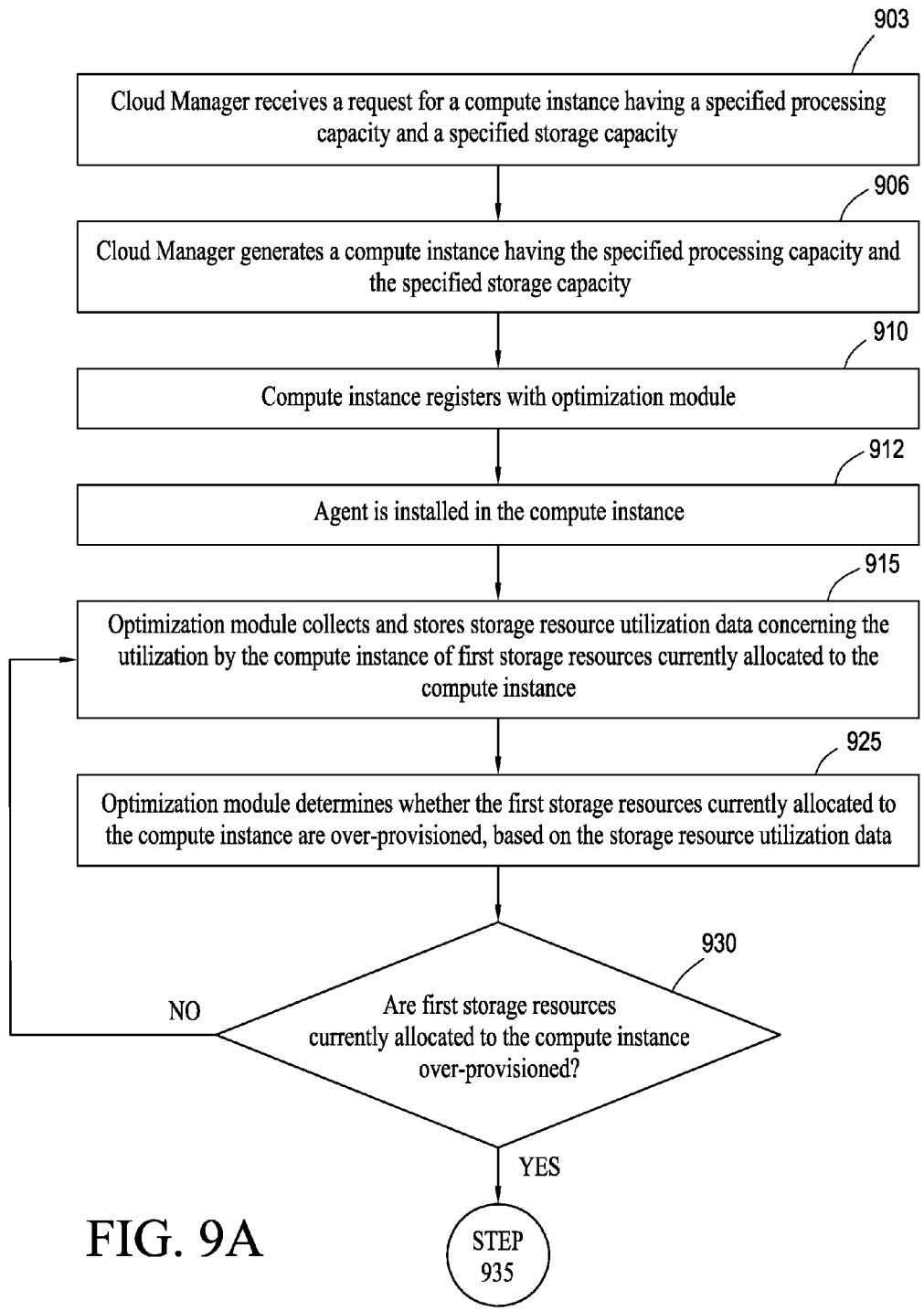
FIGS. 9A-9B include a flowchart of a method of adjusting allocated storage resources in response to a determination that allocated storage resources are over-provisioned in accordance with an embodiment.
Figure 9B:
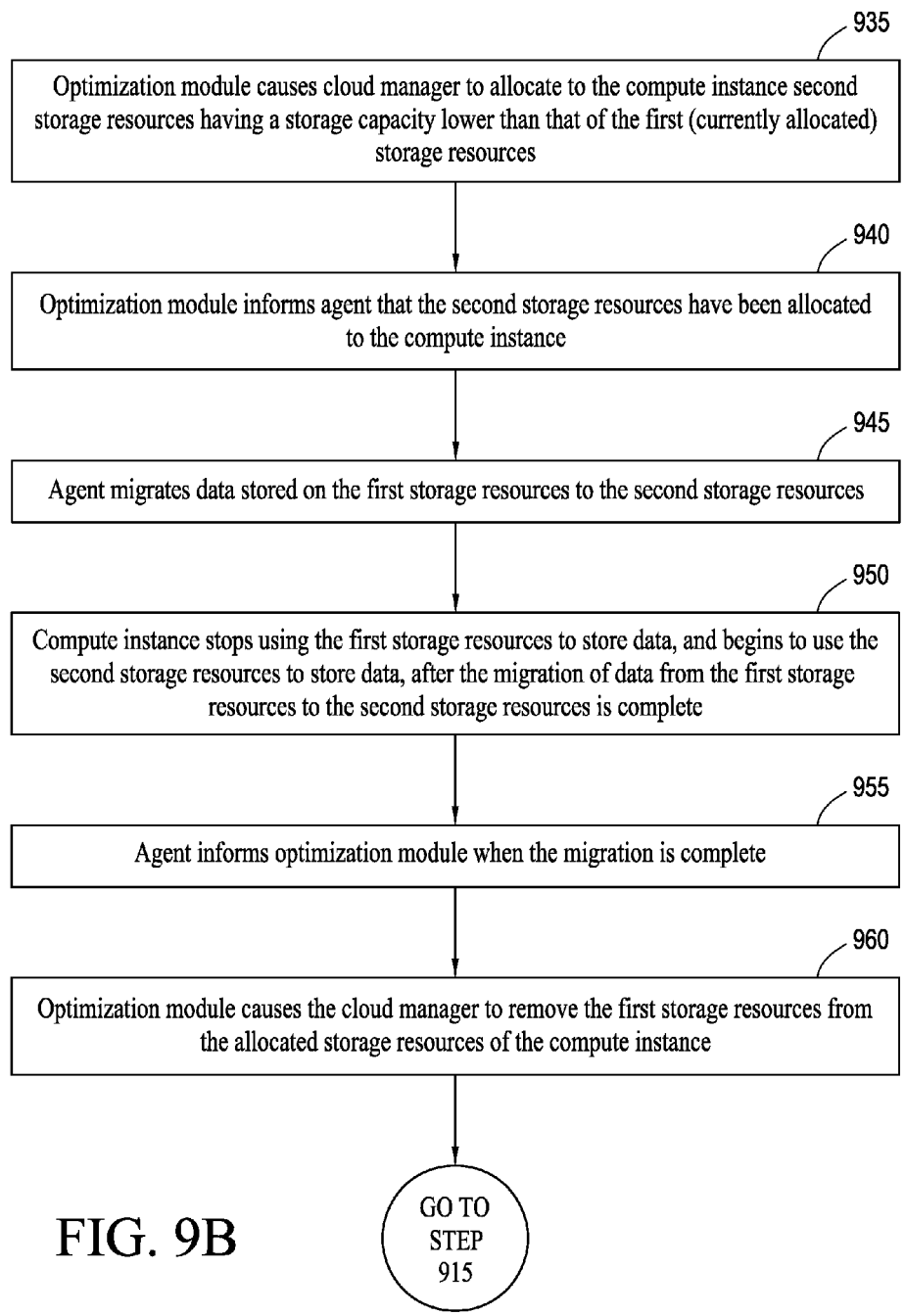

In accordance with an embodiment, allocated storage resources are adjusted in response to a determination that allocated storage capacity is over-provisioned. FIGS. 9A-9B include a flowchart of a method of adjusting allocated storage resources in response to a determination that allocated storage resources are over-provisioned, in accordance with an embodiment. The method of FIGS. 9A-9B is discussed with reference to FIGS. 10-12.

Figure 10:
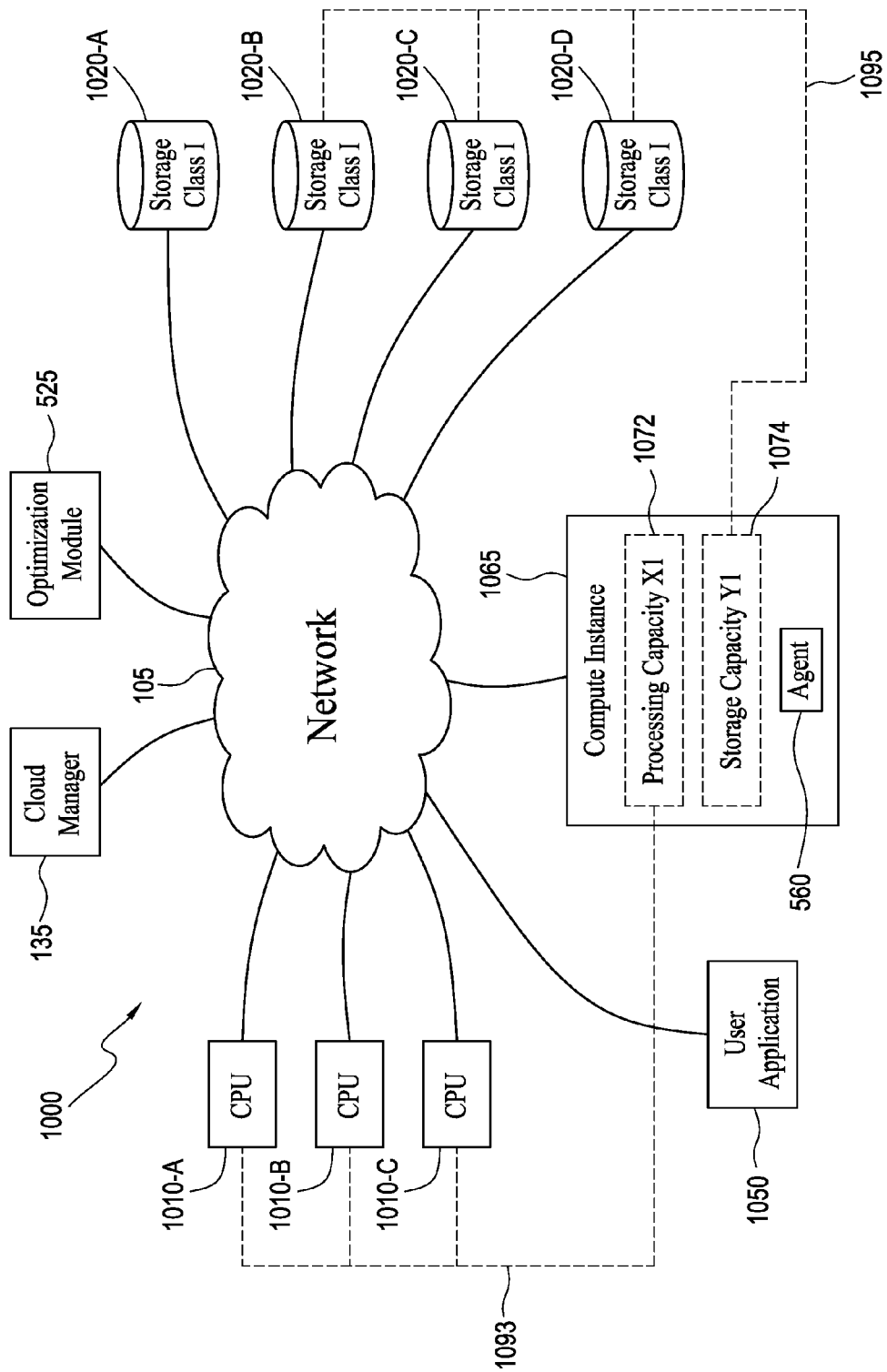
FIG. 10 shows a cloud services system in accordance with an embodiment.

FIG. 10 shows a cloud services system in accordance with an embodiment. Cloud services system 1000 includes network 105, cloud manager 135, and optimization module 525. Cloud services system 1000 also includes CPU resources 1010-A, 1010-B, and 1010-C, and storage resources 1020-A, 1020-B, 1020-C, and 1020-D. Storage resources 1020-A, 1020-B, 1020-C, and 1020-D are Class I storage devices.

Referring to FIG. 9A, at step 903, a request for a compute instance having a specified processing capacity and a specified storage capacity is received. At step 906, a compute instance having the specified processing capacity and the specified storage capacity is generated, in response to the request.

In the illustrative embodiment, a user application 1050 submits to cloud manager 135 a request for a compute instance having processing capacity X1 and storage capacity Y1. Cloud manager 135 receives the request and, in response, generates a compute instance 1065 having a processing capacity X1 (1072) and a storage capacity Y1 (1074).

Cloud manager 135 determines that CPU resources 1010-A, 1010-B, 1010-C are sufficient to provide the specified amount of processing capacity and therefore allocates CPU resources 1010-A, 1010-B, 1010-C to compute instance 1065. Thus, processing capacity X1 (1072) of compute instance 1065 is associated with CPU resources 1010-A, 1010-B, 1010-C. The allocation of CPU resources is represented in FIG. 10 by links 1093.

Cloud manager 135 determines that storage resources 1020-B, 1020-C, and 1020-D are sufficient to provide the desired storage capacity and therefore allocates storage resources 1020-B, 1020-C, and 1020-D to compute instance 1065. Thus, storage capacity Y1 (1074) of compute instance 1065 is associated with storage resources 1020-B, 1020-C, and 1020-D. The allocation of storage resources is represented in FIG. 10 by links 1095. In this illustrative embodiment, storage resource 1020-A is not at this time allocated to compute instance 1065. Also, in this illustrative embodiment, only Class I storage resources are allocated to compute instance 1065.

At step 910, a compute instance is registered with an optimization module. Compute instance 1065 submits a request for registration. In response, optimization module 525 registers compute instance 1065.

At step 912, an agent is installed in the compute instance. For example, agent 560 may be installed in compute instance 1065 by a customer or user. Agent 560 begins to monitor the utilization by compute instance of storage resources 1020-B, 1020-C, and 1020-D. Agent 560 transmits the storage resource utilization data to optimization module 525.

At step 915, the optimization module collects and stores storage resource utilization data concerning the utilization by the compute instance of first storage resources currently allocated to the compute instance. In the illustrative embodiment, optimization module 525 receives from agent 560 storage resource utilization data indicating utilization by compute instance 1065 of storage resources 1020-B, 1020-C, and 1020-D, and stores the storage resource utilization data (in database 740).

At step 925, the optimization module determines whether the first storage resources currently allocated to the compute instance are over-provisioned, based on the storage resource utilization data. In the illustrative embodiment, policy engine 710 of optimization module 525 applies predetermined rules to determine whether the storage resources allocated to compute instance 1065 are over-provisioned. For example, policy engine 710 may apply the rules shown in FIG. 7B to determine whether the storage capacity actually used by compute instance 1065 is less than the storage capacity of storage resources 1020-B, 1020-C, and 1020-D (which are allocated to compute instance 1065).

In accordance with block 930, if the first storage resources currently allocated to the compute instance are not over-provisioned, the routine returns to step 915, and optimization module continues to collect and monitor storage resource utilization data. If the first storage resources currently allocated to the compute instance are over-provisioned, the routine proceeds to step 935. Supposing that policy engine 710 of optimization module 525 determines that the storage capacity actually used by compute instance 1065 is less than the storage capacity of storage resources 1020-B, 1020-C, and 1020-D, policy engine 710 therefore concludes that the first storage resources currently allocated to compute instance 1065 are over-provisioned, and proceeds to step 935.

At step 935, second storage resources that have a storage capacity lower than that of the first storage resources are allocated to the compute instance. Preferably, second storage resources having a storage capacity lower than that of the first storage resources, and equal to or greater than the storage capacity actually utilized by the compute instance, are allocated to the compute instance. In the illustrative embodiment, optimization module 525 communicates with cloud manager 135 and causes cloud manager 135 to allocate storage resource 1020-A to compute instance 1065. For example, cloud manager 135 may provide APIs that can be used for resource allocation; optimization module 525 uses the APIs to interact with cloud manager 135 and request that storage resource 1020-A be allocated to compute instance 1065. As a result, storage resource 1020-A, 1020-B, 1020-C, and 1020-D are now allocated to compute instance 1065.

In the illustrative embodiment, storage resource 1020-A has a storage capacity lower than the total storage capacity of storage resources 1020-B, 1020-C, and 1020-D.

Figure 11:
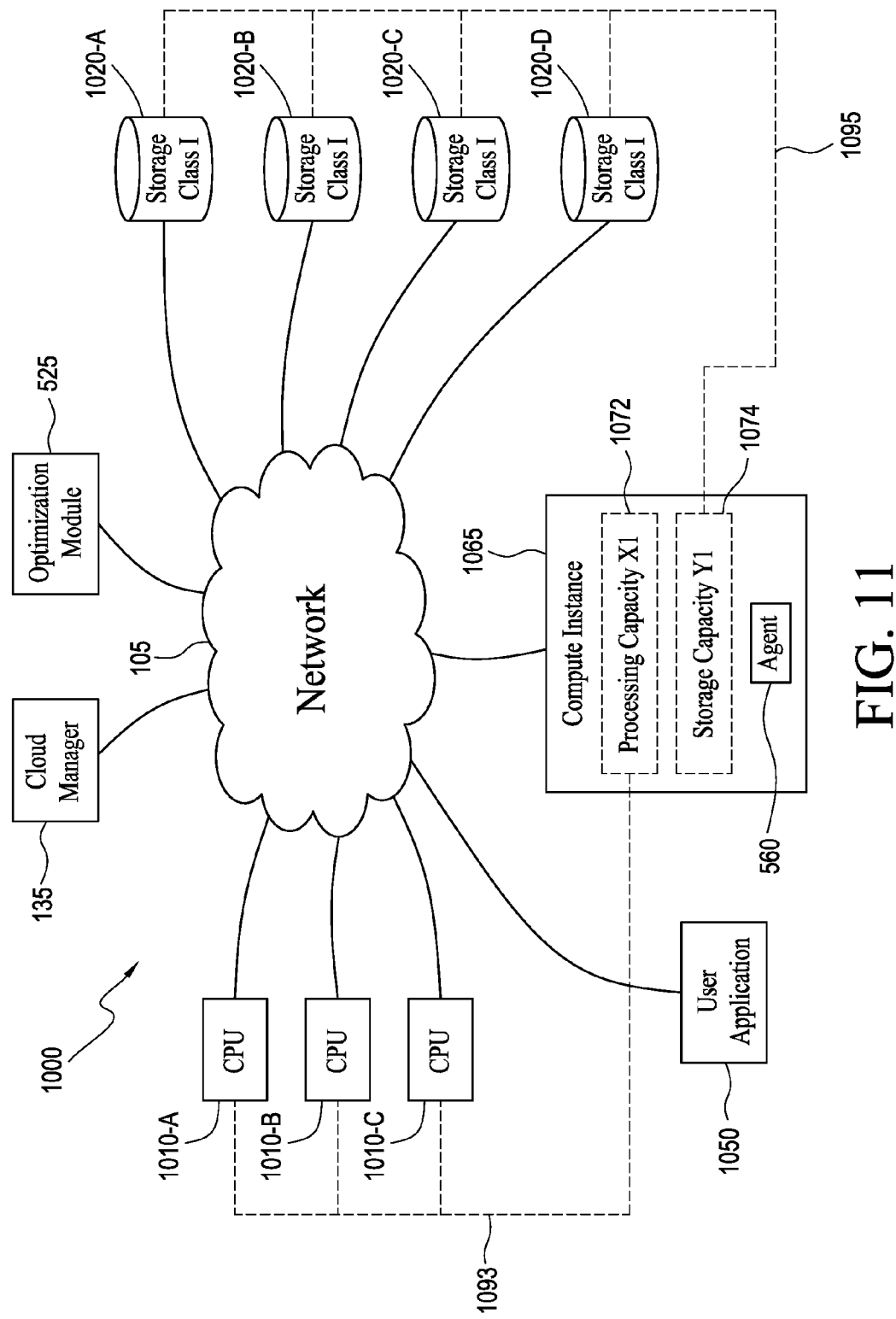
FIG. 11 shows a cloud services system after additional storage resources have been allocated to a compute instance in accordance with an embodiment.

FIG. 11 shows the cloud services system of FIG. 10 after additional storage resources 1020-A have been allocated to compute instance 1065. Now storage resources 1020-A, 1020-B, 1020-C, and 1020-D are all allocated to compute instance 1065, as indicated by links 1095.

At step 940, the optimization module informs the agent that the second storage resources have been allocated to the compute instance. Policy engine 710 of optimization module 525 informs user mode module 820 of agent 560 that storage resource 1020-A has been allocated to compute instance 1065. User mode module 820 of agent 560 instructs kernel driver 830 of agent 560 to utilize the newly allocated storage resource 1020-A.

At step 945, the agent migrates data stored on the first storage resources to the second storage resources. In the illustrative embodiment, kernel driver 830 of agent 560 migrates the data stored in storage resources 1020-B, 1020-C, and 1020-D to storage resource 1020-A. When the migration is complete, kernel driver 830 of agent 560 notifies user mode module 820 (of agent 560).

Advantageously, the allocation of the second storage resources, and the migration of data from the first storage resources to the second storage resources, are performed transparently, automatically, and without user input, in such a manner that neither the user nor user application 350 is aware of the allocation of the second storage resources or of the migration of data.

At step 950, the compute instance stops using the first storage resources to store data, and begins to use the second storage resources to store data, after the migration of data from the first storage resources to the second storage resources is complete. In the illustrative embodiment, compute instance 1065 stops storing data in storage resources 1020-B, 1020-C, and 1020-D and stores new data in storage resource 1020-A.

At step 955, the agent informs the optimization module when the migration is complete. User mode module 820 of agent 560 now informs optimization module 525 that the migration is complete.

At step 960, the optimization module causes the cloud manager to remove the first storage resources from the allocated storage resources of the compute instance. Optimization module 525 causes cloud manager 135 to de-allocate (remove) storage resources 1020-B, 1020-C, and 1020-D from the set of storage resources allocated to compute instance 1065. In response, cloud manager 135 de-allocates (removes) storage resources 1020-B, 1020-C, and 1020-D from the set of storage resources that are allocated to compute instance 1065. For example, optimization module 525 may use APIs provided by cloud manager 135 to request that cloud manager 135 remove storage resources 1020-B, 1020-C. 1020-D from the set of storage resources allocated to compute instance 1065.

Advantageously, the de-allocation of storage resources 1020-B, 1020-C, and 1020-D is performed transparently, automatically, and without user input, in such a manner that neither the user nor user application 350 is aware of the de-allocation.

Figure 12:
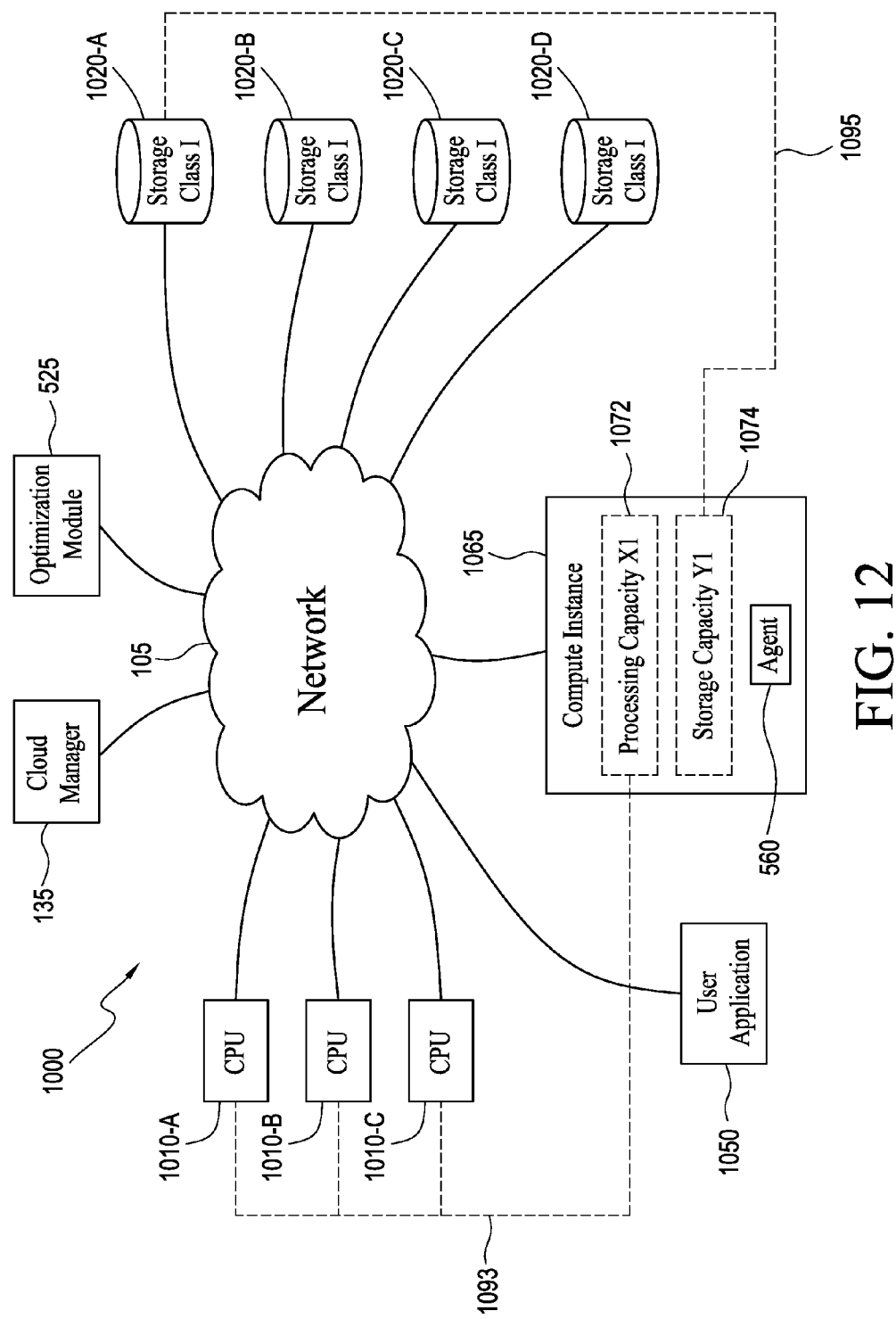
FIG. 12 shows a cloud services system after storage resources have been removed from the set of storage resources allocated to a compute instance.

FIG. 12 shows cloud services system 1000 after storage resources 1020-B, 1020-C, and 1020-D have been removed from the set of storage resources allocated to compute instance 1065. Now only storage resource 1020-A is allocated to compute instance 1065. Compute instance 1065 no longer has access to storage resources 1020-B, 1020-C, and 1020-D.

The routine now returns to step 915 and the optimization module resumes monitoring the utilization of allocated storage resources by the compute instance. Agent 560 now monitors the utilization by compute instance 1065 of its allocated storage resources (i.e., storage resource 1020-A), and transmits storage resource utilization data to optimization module 525. Optimization module 525 continues to analyze the storage resource utilization data and may further adjust the allocation of storage resources as necessary to optimize the utilization thereof.

Figure 13A:
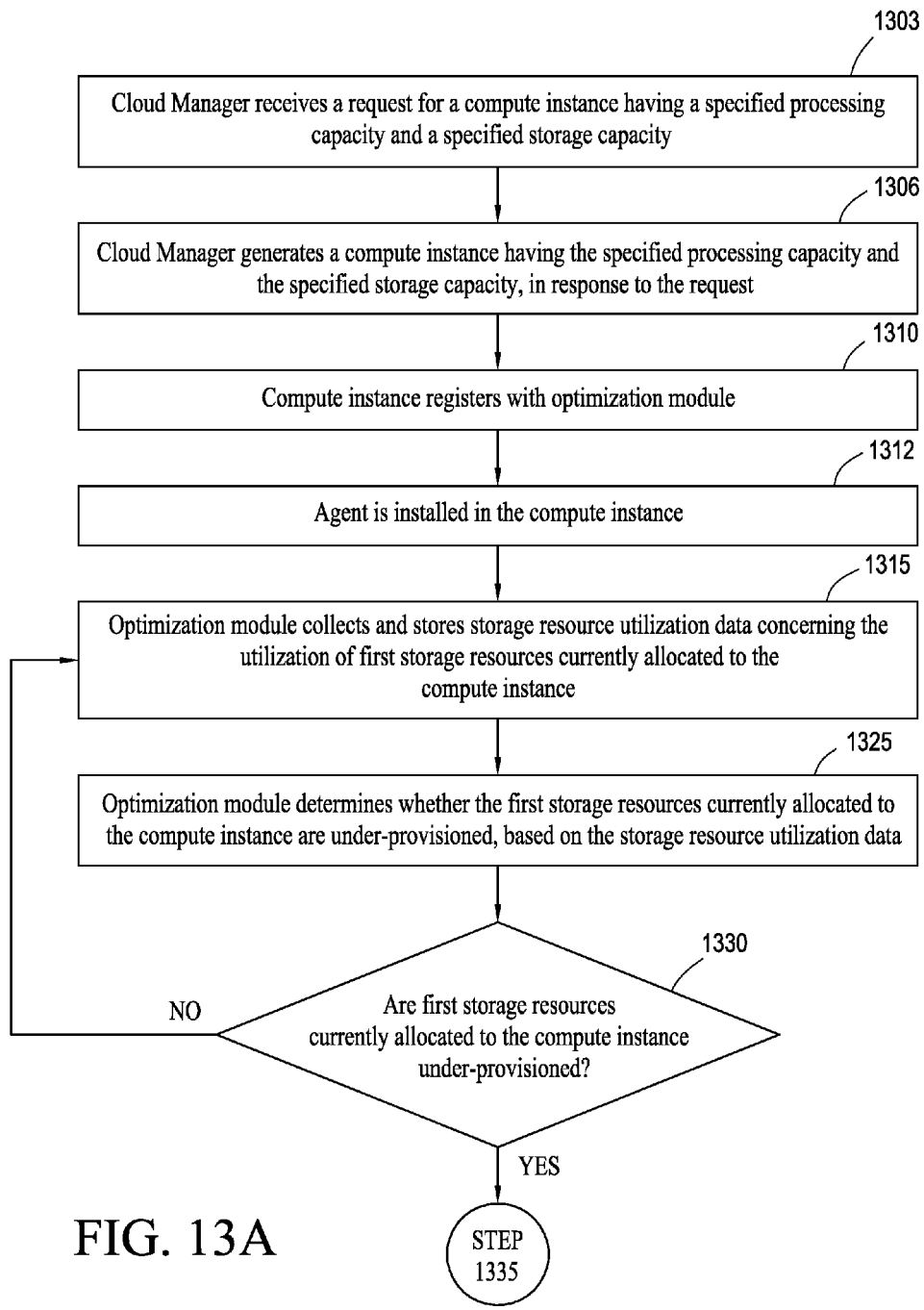
FIGS. 13A-13B include a flowchart of a method of adjusting allocated storage resources in response to a determination that allocated storage resources are under-provisioned in accordance with an embodiment.
Figure 13B:
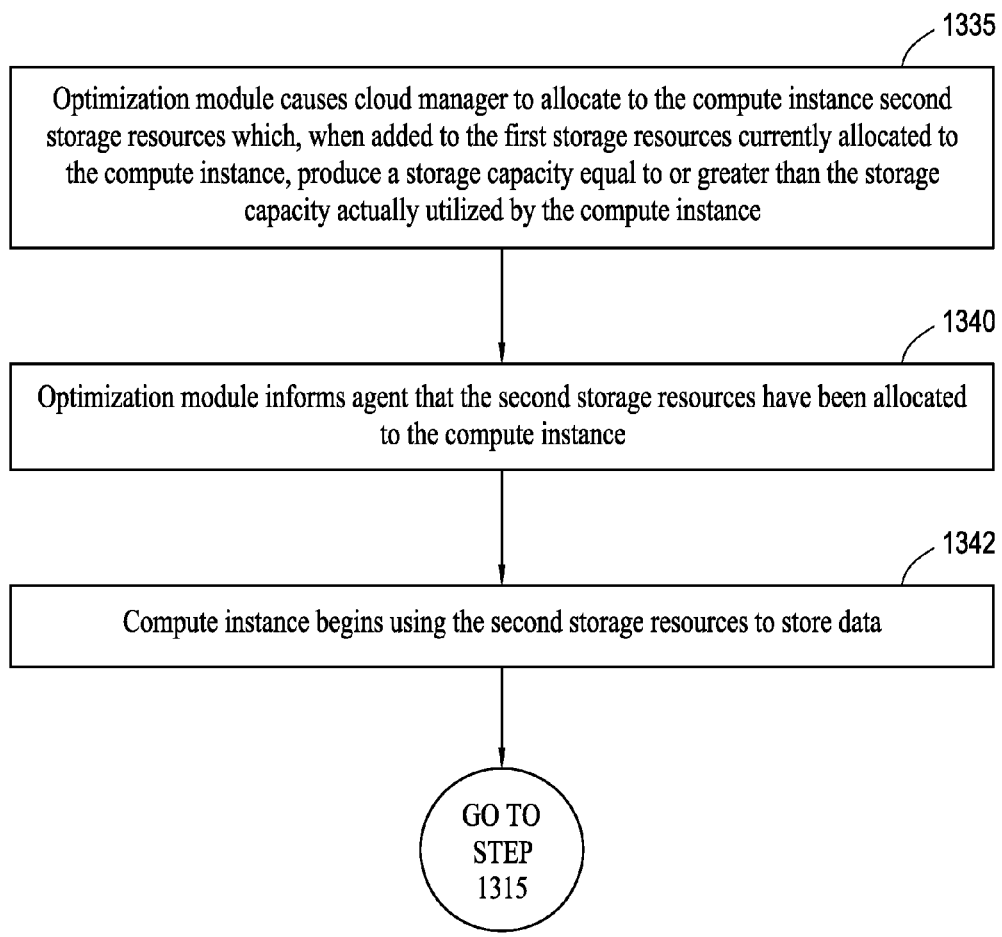

In accordance with an embodiment, allocated storage resources are adjusted in response to a determination that allocated storage resources are under-provisioned. FIGS. 13A-13B include a flowchart of a method of adjusting allocated storage resources in response to a determination that allocated storage resources are under-provisioned, in accordance with an embodiment. The method of FIGS. 13A-13B is discussed with reference to FIGS. 14-15.

Figure 14:
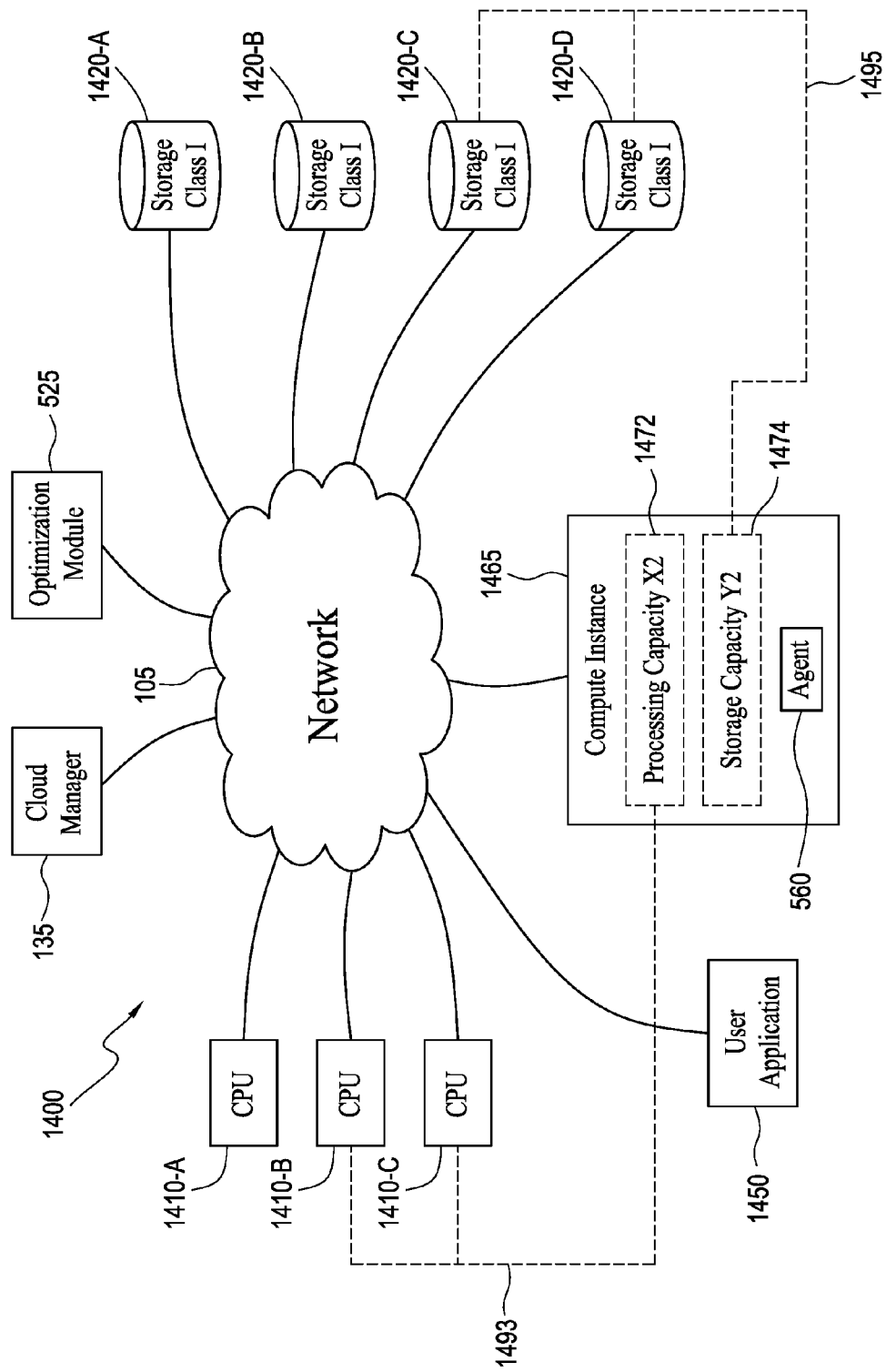
FIG. 14 shows a cloud services system in accordance with an embodiment.

FIG. 14 shows a cloud services system in accordance with an embodiment. Cloud services system 1400 includes network 105, cloud manager 135, and optimization module 525. Cloud services system 1400 also includes CPU resources 1410-A, 1410-B, and 1410-C, and storage resources 1420-A, 1420-B, 1420-C, and 1420-D. Storage resources 1420-A, 1420-B, 1420-C, and 1420-D are Class I storage devices.

Referring to FIG. 13A, at step 1303, a request for a compute instance having a specified processing capacity and a specified storage capacity is received. At step 1306, a compute instance having the specified processing capacity and the specified storage capacity is generated, in response to the request.

In the illustrative embodiment, a user application 1450 submits to cloud manager 135 a request for a compute instance having processing capacity X2 and storage capacity Y2. In response to the request, cloud manager 135 generates a compute instance 1465 having a processing capacity X2 (1472) and a storage capacity Y2 (1474).

Cloud manager 135 determines that CPU resources 1410-B and 1410-C are sufficient to provide the specified amount of processing capacity and therefore allocates CPU resources 1410-B and 1410-C to compute instance 1465. Thus, processing capacity X2 (1472) of compute instance 1465 is associated with CPU resources 1410-B and 1410-C. The allocation of CPU resources is represented in FIG. 14 by links 1493. In this illustrative embodiment, CPU resource 1410-A is not allocated to compute instance 1465.

Cloud manager 135 determines that storage resources 1420-C and 1420-D are sufficient to provide the desired storage capacity and therefore allocates storage resources 1420-C and 1420-D to compute instance 1465. Thus, storage capacity Y2 (1474) of compute instance 1065 is associated with storage resources 1420-C and 1420-D. The allocation of storage resources is represented in FIG. 14 by links 1495. In this illustrative embodiment, only Class I storage resources are allocated to compute instance 1465.

At step 1310, a compute instance is registered with an optimization module. Compute instance 1465 submits a request for registration. In response, optimization module 525 registers compute instance 1465.

At step 1312, an agent is installed in the compute instance. For example, a customer or user may install agent 560 on compute instance 1465. Agent 560 begins to monitor the utilization by compute instance 1465 of storage resources 1420-C and 1420-D. Agent 560 transmits the storage resource utilization data to optimization module 525 (via network 105, for example).

At step 1315, the optimization module collects and stores storage resource utilization data concerning the utilization of first storage resources currently allocated to the compute instance. In the illustrative embodiment, optimization module 525 receives from agent 560 storage resource utilization data concerning the utilization by compute instance 1465 of storage resources 1420-C and 1420-D, and stores the storage resource utilization data (in database 740).

At step 1325, the optimization module determines whether the first storage resources currently allocated to the compute instance are under-provisioned, based on the storage resource utilization data. For example, in the illustrative embodiment, policy engine 710 of optimization module 525 may apply the rules shown in FIG. 7C to determine whether the storage resources allocated to compute instance 1465 are under-provisioned. Specifically, policy engine 710 determines whether the storage capacity actually used by compute instance 1465 is greater than the storage capacity of storage resources 1420-C and 1420-D (which are allocated to compute instance 1465).

In accordance with block 1330, if the first storage resources currently allocated to the compute instance are not under-provisioned, the routine returns to step 1315. If the first storage resources currently allocated to the compute instance are under-provisioned, the routine proceeds to step 1335. Supposing that policy engine 710 of optimization module 525 determines that the storage capacity actually used by compute instance 1465 is greater than the storage capacity of storage resources 1420-C and 1420-D, policy engine 710 therefore concludes that the first storage resources currently allocated to compute instance 1465 are under-provisioned, and proceeds to step 1335.

At step 1335, second storage resources which, when added to the first storage resources currently allocated to the compute instance, produce a storage capacity equal to or greater than the storage capacity actually utilized by the compute instance, are allocated to the compute instance. In the illustrative embodiment, optimization module 525 communicates with cloud manager 135 and causes cloud manager 135 to allocate storage resource 1420-A and storage resource 1420-B to compute instance 1465. For example, optimization module 525 may use APIs provided by cloud manager 135 to request that cloud manager 135 allocate storage resource 1420-A and 1420-B to compute instance 1465. As a result, now storage resources 1420-A, 1420-B, 1420-C, and 1420-D are all allocated to compute instance 1465.

Figure 15:
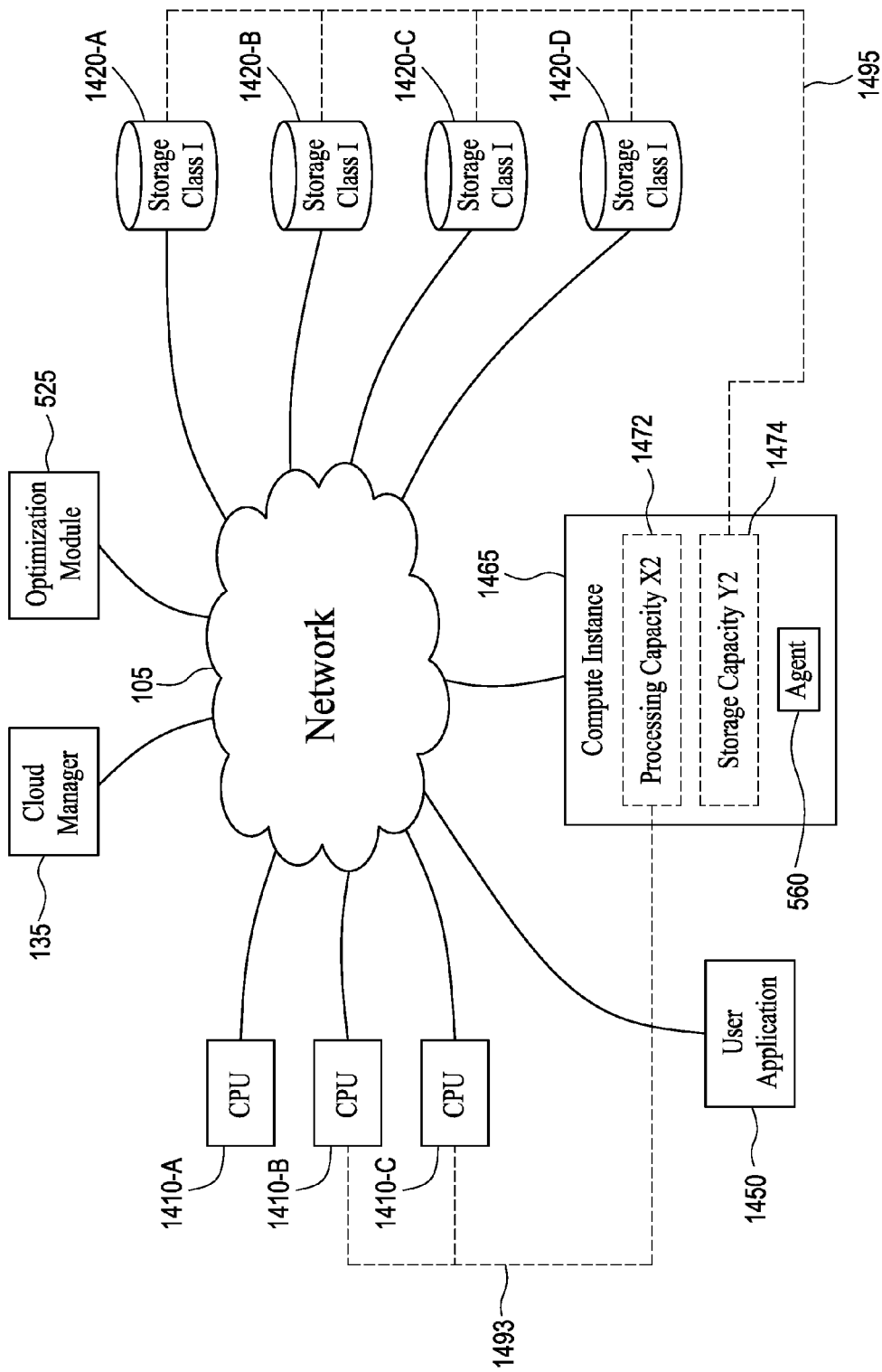
FIG. 15 shows a cloud services system after additional storage resources have been allocated to a compute instance in accordance with an embodiment.

FIG. 15 shows the cloud services system of FIG. 14 after additional storage resources 1420-A and 1420-B have been allocated to compute instance 1465. Now storage resources 1420-A, 1420-B, 1420-C, and 1420-D are all allocated to compute instance 1465, as indicated by links 1495.

At step 1340, the optimization module informs the agent that the second storage resources have been allocated to the compute instance. Policy engine 710 of optimization module 525 informs user mode module 820 of agent 560 that storage resource 1420-A and 1420-B have been allocated to compute instance 1465. User mode module 820 of agent 560 instructs kernel driver 830 of agent 560 to utilize the newly allocated storage resources 1420-A and 1420-B. Accordingly, at step 1342, compute instance 1465 begins to use the second storage resources to store data. Subsequently, compute instance 1465 utilizes storage resources 1420-A, 1420-B, 1420-C, and 1420-D.

Advantageously, the allocation of second storage resources is performed transparently, automatically, and without user input, in such a manner that neither the user nor user application 1450 is aware of the allocation of the second storage resources.

The routine now returns to step 1315 and the optimization module resumes monitoring the utilization of allocated storage resources by the compute instance. Agent 560 now monitors the utilization by compute instance 1465 of its allocated storage resources (i.e., storage resources 1420-A, 1420-B, 1420-C, and 1420-D), and transmits storage resource utilization data to optimization module 525. Optimization module 525 continues to analyze the storage resource utilization data and may further adjust the allocation of storage resources as necessary to optimize the utilization thereof.

Figure 16A:
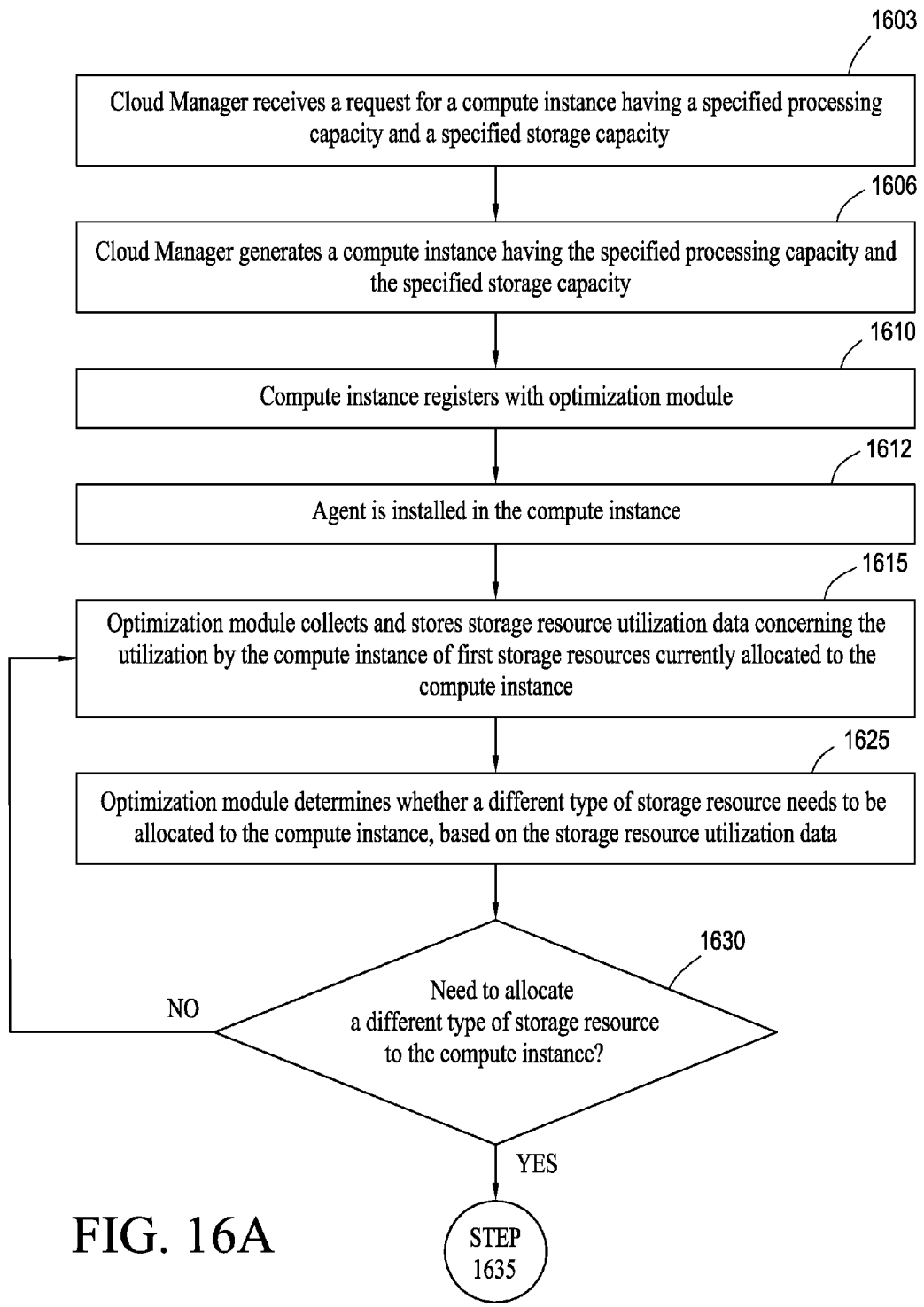
FIGS. 16A-16B include a flowchart of a method of adjusting allocated storage resources in response to a determination that a different type of storage resource needs to be allocated in accordance with an embodiment.
Figure 16B:
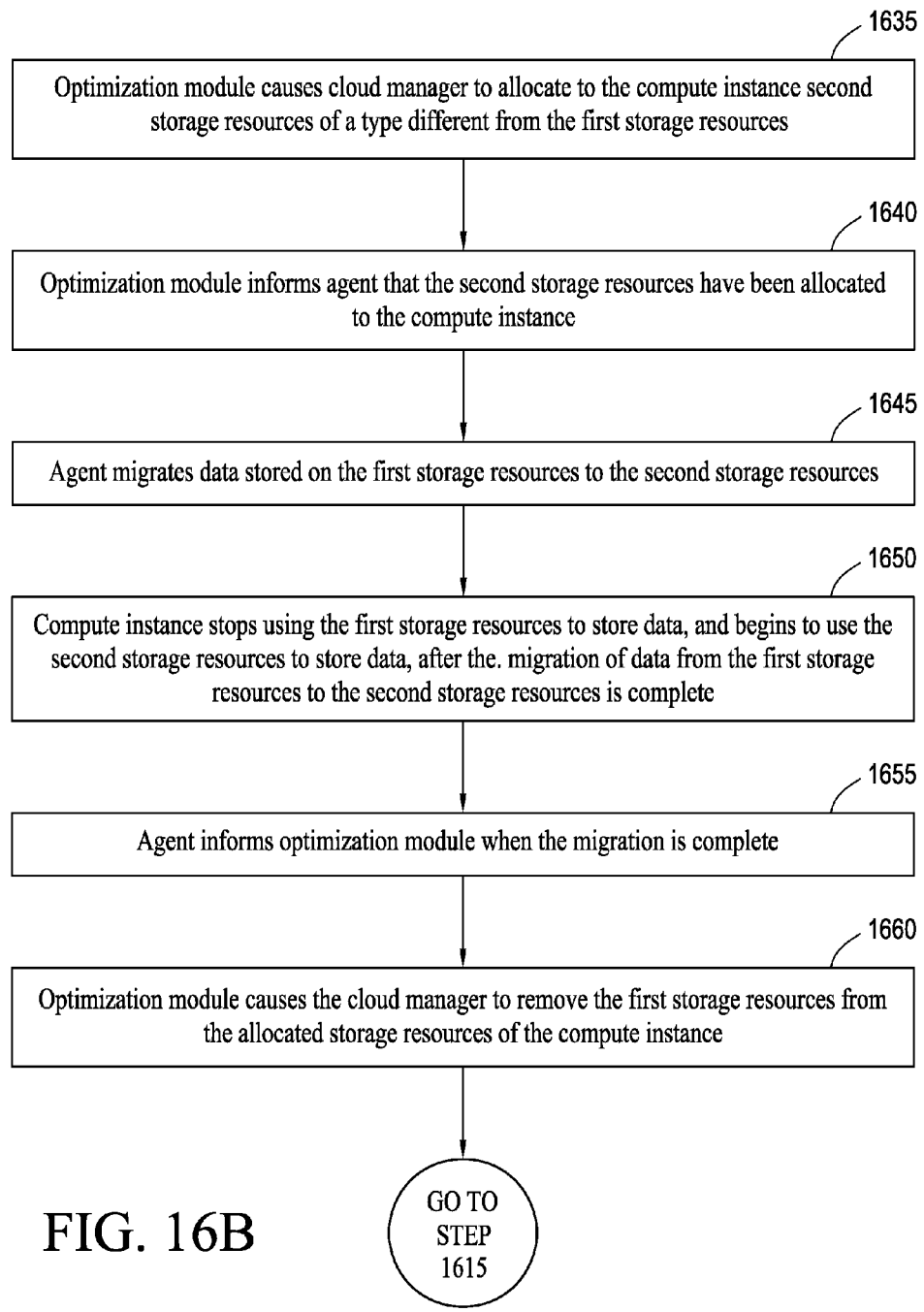

In accordance with an embodiment, allocated storage resources are adjusted in response to a determination that a different type of storage resource is needed to optimize storage resource utilization. FIGS. 16A-16B include a flowchart of a method of adjusting allocated storage resources in response to a determination that a different type of storage resource is needed to optimize storage resources utilization, in accordance with an embodiment. The method of FIGS. 16A-16B is discussed with reference to FIGS. 17-19.

Figure 17:
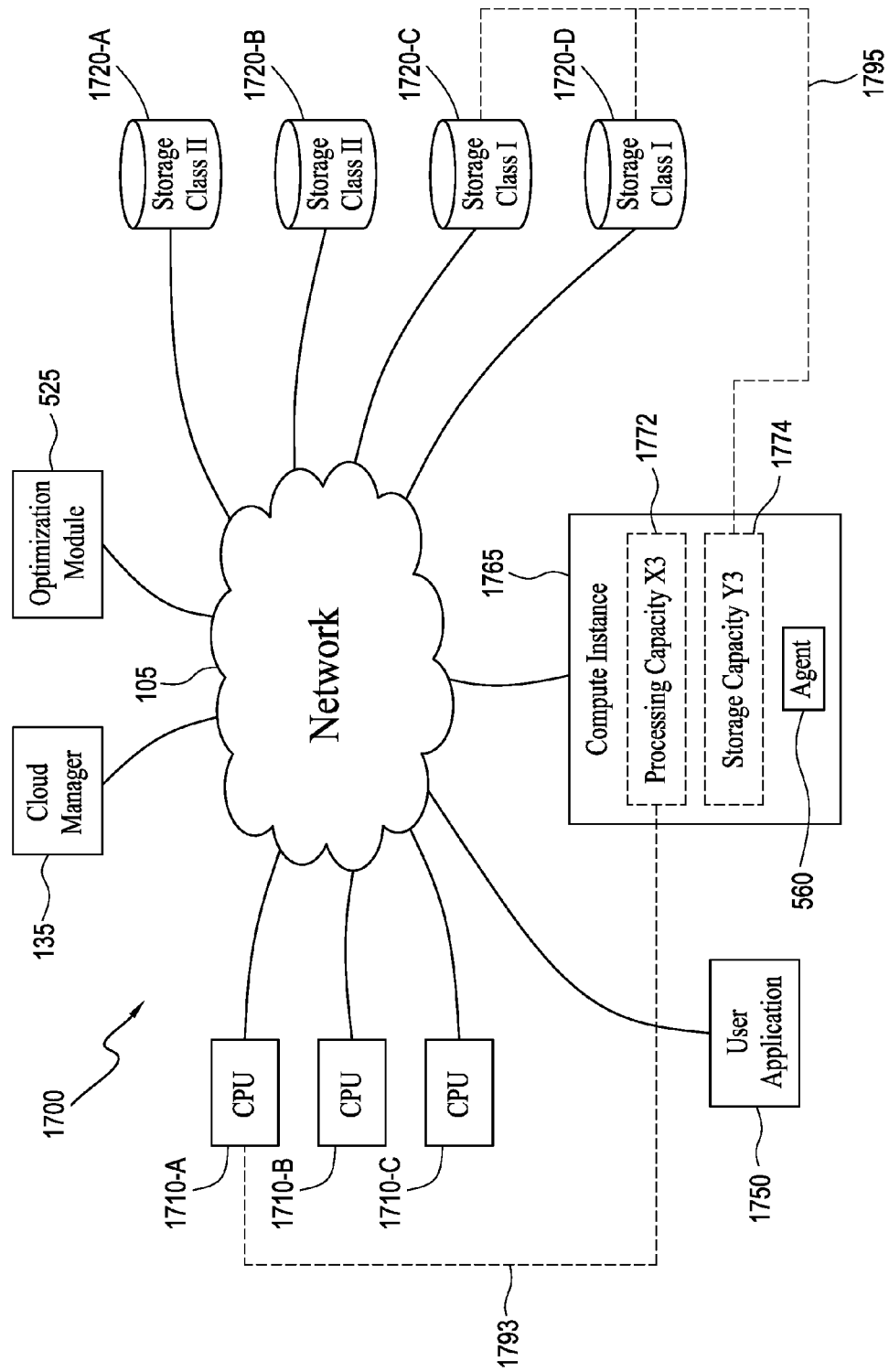
FIG. 17 shows a cloud services system in accordance with an embodiment.

FIG. 17 shows a cloud services system in accordance with an embodiment. Cloud services system 1700 includes network 105, cloud manager 135, and optimization module 525. Cloud services system 1700 also includes CPU resources 1710-A, 1710-B, and 1710-C, and storage resources 1720-A, 1720-B, 1720-C, and 1720-D. Storage resources 1720-A and 1720-B are Class II storage devices, while storage resources 1720-C and 1720-D are Class I storage devices.

Referring to FIG. 16A, at step 1603, a request for a compute instance having a specified processing capacity and a specified storage capacity is received. At step 1606, a compute instance having the specified processing capacity and the specified storage capacity is generated, in response to the request.

In the illustrative embodiment, a user application 1750 submits to cloud manager 135 a request for a compute instance having processing capacity X3 and storage capacity Y3. In response to the request, cloud manager 135 generates a compute instance 1765 having a processing capacity X3 (1772) and a storage capacity Y3 (1774).

Cloud manager 135 determines that CPU resource 1710-A is sufficient to provide the specified amount of processing capacity and therefore allocates CPU resource 1710-A to compute instance 1765. Thus, processing capacity X3 (1772) of compute instance 1765 is associated with CPU resource 1710-A. CPU resources 1010-B and 1010-C are not allocated to compute instance 1765. The allocation of CPU resource 1710-A to compute instance 1765 is represented in FIG. 17 by link 1793.

Cloud manager 135 determines that storage resources 1720-C and 1720-D are sufficient to provide the desired storage capacity and therefore allocates storage resources 1720-C and 1720-D to compute instance 1765. Thus, storage capacity Y3 (1774) of compute instance 1765 is associated with storage resources 1720-C and 1720-D. The allocation of storage resources is represented in FIG. 17 by links 1795. In this illustrative embodiment, storage resources 1720-A and 1720-B are not at this time allocated to compute instance 1765. Also, in this illustrative embodiment, only Class I storage resources are at this time allocated to compute instance 1765.

At step 1610, a compute instance is registered with an optimization module. Compute instance 1765 submits a request for registration. In response, optimization module 525 registers compute instance 1765.

At step 1612, an agent is installed in the compute instance. For example, a customer or user may install agent 560 on compute instance 1765. Agent 560 begins to monitor the utilization by compute instance of storage resources 1720-C and 1720-D. Agent 560 transmits the storage resource utilization data to optimization module 525.

At step 1615, the optimization module collects and stores storage resource utilization data concerning the utilization by the compute instance of first storage resources currently allocated to the compute instance. In the illustrative embodiment, optimization module 525 receives from agent 560 storage resource utilization data indicating utilization by compute instance 1765 of storage resources 1720-C and 1720-D, and stores the storage resource utilization data (in database 740).

At step 1625, the optimization module determines whether a different type (or class) of storage resource needs to be allocated to the compute instance, based on the storage resource utilization data. For example, in the illustrative embodiment, policy engine 710 of optimization module 525 may apply one or more predetermined rules (e.g., the rules shown in FIG. 7D) to determine whether a higher class of storage resource needs to be allocated to compute instance 1765. Alternatively, policy engine 710 may apply one or more predetermined rules (e.g., the rules shown in FIG. 7E) to determine whether a lower class of storage resource needs to be allocated to compute instance 1765.

Suppose, in an illustrative embodiment, that policy engine 710 examines the rules shown in FIGS. 7D and 7E, and examines the storage resource utilization data of compute instance 1765, and determines that a different type (or class) of storage resource needs to be allocated to compute instance 1765. In particular, suppose that policy engine 710 determines that certain bandwidth requirements associated with the data stored in storage resource 1720-C require a higher bandwidth performance than storage resource 1720-C is currently capable of providing, and that this data should therefore be stored in a Class II storage device (instead of in a Class I storage device). Accordingly, policy engine 710 determines that a class II storage resource needs to be allocated to compute instance 1765.

Referring to block 1630, if there is no need to allocate a different type (or class) of storage resource to the compute instance, the routine returns to step 1615. If a different type (or class) of storage resource needs to be allocated to the compute instance, the routine proceeds to step 1635. In the illustrative embodiment, because policy engine 710 has determined that a higher class of storage resources needs to be allocated to the compute instance, policy engine 710 proceeds to step 1635.

At step 1635, second storage resources of a type (or class) different from the first storage resources are allocated to the compute instance. In the illustrative embodiment, optimization module 525 communicates with cloud manager 135 and causes cloud manager 135 to allocate storage resource 1720-A (which is a Class II storage device) to compute instance 1765. For example, optimization module 525 may use APIs provided by cloud manager 135 to request that cloud manager 135 allocate storage resource 1720-A to compute instance 1765. As a result, storage resource 1720-A, 1720-C, and 1720-D are now allocated to compute instance 1065.

Advantageously, the allocation of the second storage resources is performed transparently, automatically, and without user input, in such a manner that neither the user nor user application 1750 is aware of the allocation of the second storage resources.

Figure 18:
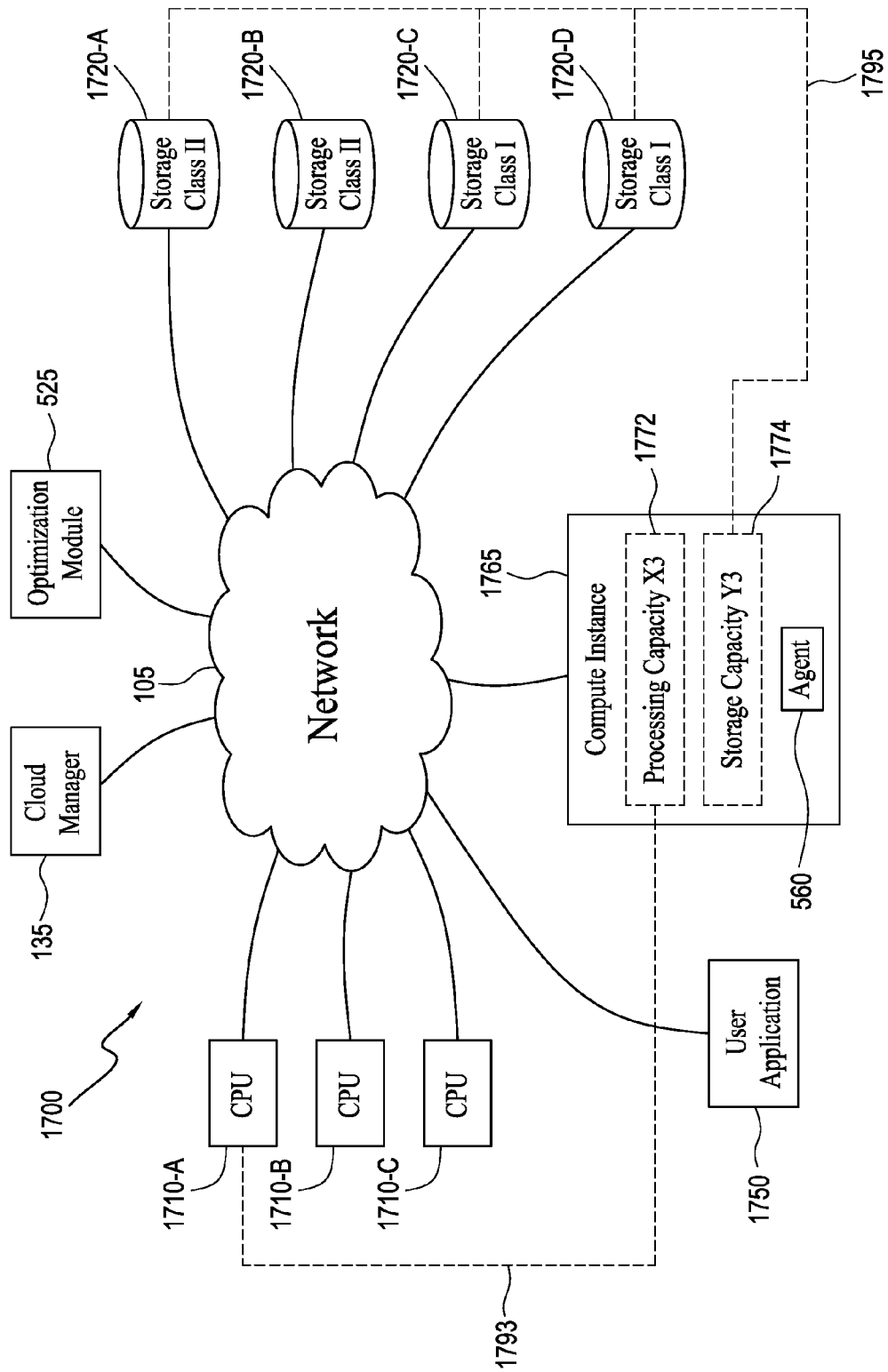
FIG. 18 shows a cloud services system after additional storage resources have been allocated to a compute instance in accordance with an embodiment.

FIG. 18 shows the cloud services system of FIG. 17 after additional storage resources 1720-A have been allocated to compute instance 1765. Now storage resources 1720-A, 1720-C, and 1020-D are all allocated to compute instance 1765, as indicated by links 1795. Storage resource 1720-A is a Class II storage device while storage resources 1720-C and 1720-D are Class I storage devices.

At step 1640, the optimization module informs the agent that the second storage resources have been allocated to the compute instance. Policy engine 710 of optimization module 525 informs user mode module 820 of agent 560 that storage resource 1720-A has been allocated to compute instance 1765. User mode module 820 of agent 560 instructs kernel driver 830 of agent 560 to utilize the newly allocated storage resource 1720-A.

At step 1645, the agent migrates data stored on the first storage resources to the second storage resources. In the illustrative embodiment, kernel driver 830 of agent 560 migrates the data stored in storage resources 1720-C to storage resource 1720-A. When the migration is complete, kernel driver 830 of agent 560 notifies user mode module 820 (of agent 560).

At step 1650, the compute instance stops using the first storage resources to store data, and begins to use the second storage resources to store data, after the migration of data from the first storage resources to the second storage resources is complete. In the illustrative embodiment, compute instance 1765 stops storing data in storage resource 1720-C and begins to store data in storage resource 1720-A.

At step 1655, the agent informs the optimization module when the migration is complete. User mode module 820 of agent 560 now informs optimization module 525 that the migration is complete.

At step 1660, the optimization module causes the cloud manager to de-allocate (remove) the first storage resources from the allocated storage resources of the compute instance. Optimization module 525 causes cloud manager 135 to remove storage resource 1720-C from the set of storage resources allocated to compute instance 1765. In response, cloud manager 135 removes storage resources 1720-C from the set of storage resources that are allocated to compute instance 1765. For example, optimization module 525 may use APIs provided by cloud manager 135 to request that cloud manager 135 remove storage resource 1720-C from the set of storage resources allocated to compute instance 1765.

Advantageously, de-allocation of the first storage resources from the set of storage resources allocated to compute instance 1765 is performed transparently and automatically, and without user input, in such a manner that neither the customer/user nor the user application is aware of the de-allocation.

Figure 19:
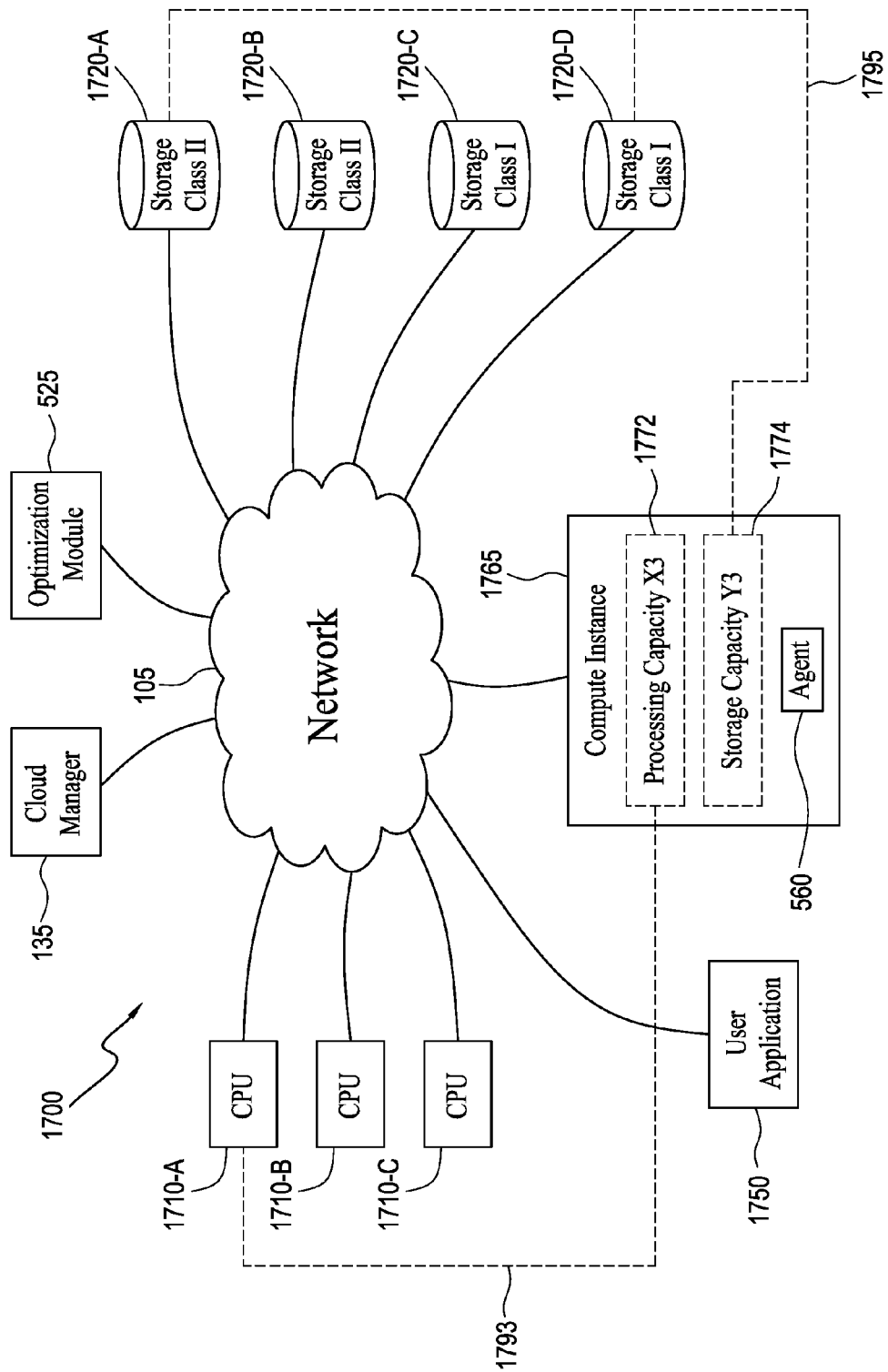
FIG. 19 shows a cloud services system after storage resources have been removed from the set of storage resources allocated to a compute instance in accordance with an embodiment.

FIG. 19 shows cloud services system 1700 after storage resource 1720-C has been removed from the set of storage resources allocated to compute instance 1765. Now only storage resources 1720-A and 1720-D are allocated to compute instance 1765. Compute instance 1765 no longer has access to storage resources 1720-C.

The routine now returns to step 1615 and the optimization module resumes monitoring the utilization of allocated storage resources by the compute instance. Agent 560 now monitors the utilization by compute instance 1765 of its allocated storage resources (i.e., storage resources 1720-A and 1720-D), and transmits storage resource utilization data to optimization module 525. Optimization module 525 continues to analyze the storage resource utilization data and may further adjust the allocation of storage resources as necessary to optimize the utilization thereof.

In other embodiments, a method similar to that of FIGS. 16A-16B may be used to determine that storage resources having lower performance capabilities should be allocated to a compute instance, and to allocate a storage resource having lower performance capabilities to the compute instance. Data may be migrated from a storage resources having higher performance capabilities to the new storage resource, and the allocation of storage resources may be changed to include the new storage resource with lower performance capabilities and to remove the now unnecessary storage resources with higher performance capabilities.

Thus, in other embodiments, a first performance class may be associated with a first performance attribute defining an aspect of performance of a storage resource (e.g., a specific storage capacity, a specific cost, a specific IOPS, a specific latency, a specific bandwidth, etc.). In one embodiment, allocated storage resources include one or more first storage resources having the first performance attribute. The optimization module may determine that a change to the allocated storage resources is necessary, for example, in response to a determination that a discrepancy, mismatch, inconsistency, or conflict exists between the first performance attribute and the actual utilization of the allocated storage resources. For example, the optimization module may determine that the first performance attribute does not satisfy requirements associated with actual utilization of the allocated storage resources. Alternatively, the optimization module may determine that a change to the allocated storage resources is necessary, in response to a determination that a measure of actual utilization of the first performance attribute is less than a first predetermined threshold or greater than a second predetermined threshold. In response to the determination, a second storage resource having a second performance attribute may be added to the allocated storage resources. The one or more first storage resources may be removed from the allocated storage resources.

In other embodiments, different classes of storage resources may be defined based on one or more cost attributes of the storage resources. For example, a first class of storage resource having a first cost attribute (e.g., higher cost) and a second class of storage resource having a second cost attribute (e.g., lower cost) may be defined. In an illustrative embodiment, storage resources from the first class of storage resources having the first cost attribute (higher cost) may be initially allocated to a compute instance, and data is stored in the allocated storage resources. Storage resource utilization data is collected, and methods similar to those of FIGS. 9A-9B, 13A-13B, and FIGS. 16A-16B may be used to determine whether storage resources of a different class, having a different cost attribute, should be allocated to the compute instance. For example, a user may define one or more rules controlling whether data is to be stored in the first class of storage resource having the first cost attribute (e.g., higher cost) or in the second class of storage resource having the second cost attribute (e.g., lower cost). After the initial allocation of storage resources having the first (higher) cost attribute, optimization module 525 monitors the utilization of storage resources and determines, based on the rules, whether a different class of storage resources should be allocated. If a determination is made that a different class of storage resources should be allocated, optimization module 525 may adjust the allocation of storage resources. For example, optimization module 525 may allocate, based on the rules, a second storage resource from the second class of storage resources having the second cost attribute (lower cost). The allocation of storage resources is changed to include the second (lower cost) storage resource with the second (lower) cost attribute. Data may be migrated from the first storage resources having the first (higher) cost attribute to the second storage resources having the second (lower) cost attribute, if necessary. The first storage resources with the first (higher) cost attribute may be de-allocated (removed), if necessary.

Alternatively, an initial allocation of the storage resources from the second class of storage resources having the second (lower) cost attribute may be made, and data may then be stored in the allocated storage resources. Optimization module 525 may then monitor the utilization of storage resources and determine, based on the rules, whether a different class of storage resources should be allocated. If a determination is made that a different class of storage resources should be allocated, optimization module 525 may adjust the allocation of storage resources by, for example, allocating storage resources from the first class of storage resources having the first cost attribute (e.g., higher cost). The allocation of storage resources is changed to include the storage resources having the first (higher) cost attribute. If necessary, data may be migrated from the storage resources having the second (lower) cost attribute to the storage resources having the first (higher) cost attribute. If necessary, the storage resources with the second (lower) cost attribute may be de-allocated.

In other embodiments, different classes of storage resources may be defined based on the life cycle of data. For example, a first class of storage resource offering a high level of availability of data (e.g., instantaneous access), a second class of storage resource offering a medium level of availability of data (e.g., some delay in access), and a third class of storage resource offering a low level of availability (e.g., substantial delay in access), may be defined. An initial allocation of storage resources may be determined, and methods similar to those of FIGS. 9A-9B, 13A-13B, and FIGS. 16A-16B may be used to determine that storage resources having a different cost attribute should be allocated to a compute instance. For example, a user may define one or more criteria controlling whether data is to be stored in a first class of storage resource having a first life cycle attribute (e.g., high level of availability), in a second class of storage resource having a second life cycle attribute (e.g., medium level of availability), or in a third class of storage resource having a third life cycle attribute (e.g. low level of availability). In an illustrative embodiment, an initial allocation of storage resources having the first life cycle attribute is determined, and data is stored in the allocated storage resources. Optimization module 525 may then monitor the utilization of storage resources and determine, based on one or more rules, whether a different class of storage resources should be allocated. Rules may be defined by a user, or a default set of rules may be used, for example. If a determination is made that a different class of storage resources should be allocated, optimization module 525 may adjust the allocation of storage resources by, for example, allocating a second storage resource having a second life cycle attribute (e.g., medium level of availability). The allocation of storage resources is changed to include the second storage resource with the second life cycle attribute. Data may be migrated from the first storage resources having the first life cycle attribute to the second storage resources having the second life cycle attribute, if necessary. The first storage resources with the first life cycle attribute are de-allocated, if necessary.

In various embodiments, the method steps described herein, including the method steps described in FIGS. 7B, 7C, 7D, 7E, 7F, 7G, 7H, 9A, 9B, 13A, 13B, 16A, and/or 16B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 7B, 7C, 7D, 7E, 7F, 7G, 7H, 9A, 9B, 13A, 13B, 16A, and/or 16B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 20:
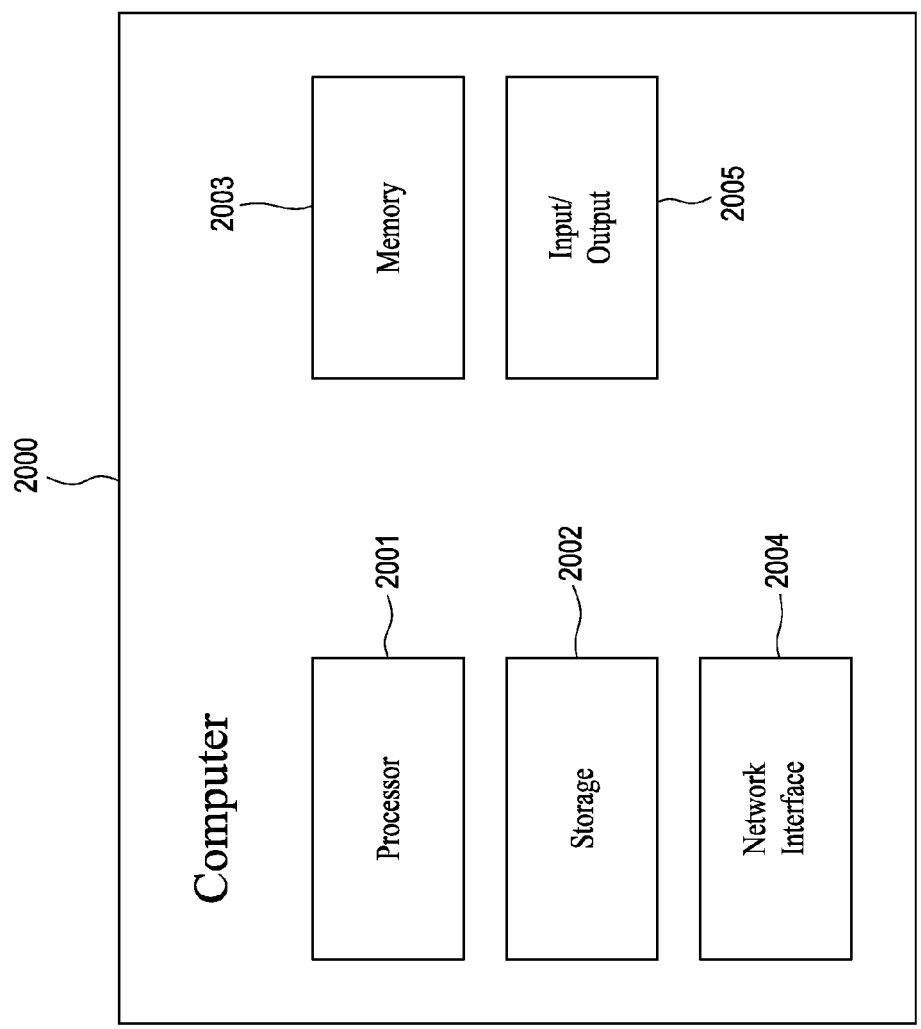
FIG. 20 shows components of an exemplary computer that may be used to implement certain embodiments.

A high-level block diagram of an exemplary computer that may be used to implement systems, apparatus and methods described herein is illustrated in FIG. 20. Computer 2000 includes a processor 2001 operatively coupled to a data storage device 2002 and a memory 2003. Processor 2001 controls the overall operation of computer 2000 by executing computer program instructions that define such operations. The computer program instructions may be stored in data storage device 2002, or other computer readable medium, and loaded into memory 2003 when execution of the computer program instructions is desired. Thus, the method steps of FIGS. 7B, 7C, 7D, 7E, 7F, 7G, 7H, 9A, 9B, 13A, 13B, 16A, and/or 16B can be defined by the computer program instructions stored in memory 2003 and/or data storage device 2002 and controlled by the processor 2001 executing the computer program instructions. For example, the computer program instructions can be implemented as computer executable code programmed by one skilled in the art to perform an algorithm defined by the method steps of FIG. 7B, 7C, 7D, 7E, 7F, 7G, 7H, 9A, 9B, 13A, 13B, 16A, and/or 16B. Accordingly, by executing the computer program instructions, the processor 2001 executes an algorithm defined by the method steps of FIGS. 7B, 7C, 7D, 7E, 7F, 7G, 7H, 9A, 9B, 13A, 13B, 16A, and/or 16B. Computer 2000 also includes one or more network interfaces 2004 for communicating with other devices via a network. Computer 2000 also includes one or more input/output devices 2005 that enable user interaction with computer 2000 (e.g., display, keyboard, mouse, speakers, buttons, etc.).

Processor 2001 may include both general and special purpose microprocessors, and may be the sole processor or one of multiple processors of computer 2000. Processor 2001 may include one or more central processing units (CPUs), for example. Processor 2001, data storage device 2002, and/or memory 2003 may include, be supplemented by, or incorporated in, one or more application-specific integrated circuits (ASICs) and/or one or more field programmable gate arrays (FPGAs).

Data storage device 2002 and memory 2003 each include a tangible non-transitory computer readable storage medium. Data storage device 2002, and memory 2003, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 2005 may include peripherals, such as a printer, scanner, display screen, etc. For example, input/output devices 2005 may include a display device such as a cathode ray tube (CRT) or liquid crystal display (LCD) monitor for displaying information to the user, a keyboard, and a pointing device such as a mouse or a trackball by which the user can provide input to computer 2000.

Any or all of the systems and apparatus discussed herein, including, for example, and without limitation, cloud manager 135, optimization module 525, user application 350, compute instance 365, agent 560, server 212, server 214, server 233, server 610, server 620, CPU resources 110, storage resources 120, storage resources 130, storage device 222, storage device 224, storage device 232, storage device 234, and storage system 660, and components thereof, may be implemented using a computer such as computer 2000.

One skilled in the art will recognize that an implementation of an actual computer or computer system may have other structures and may contain other components as well, and that FIG. 20 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A device comprising:
a memory storing computer program instructions; and
a processor communicatively coupled to the memory, the processor configured to execute the computer program instructions which, when executed on the processor, cause the processor to perform operations comprising:
installing an agent component on a compute instance residing in a cloud services system, the compute instance comprising a specified processing capacity and a specified storage capacity, wherein one or more processing resources in the cloud services system are allocated to the compute instance and one or more storage resources in the cloud services system are allocated to the compute instance, wherein the one or more storage resources have a performance attribute;
receiving from the agent component information relating to utilization by the compute instance of the one or more storage resources allocated to the compute instance;
determining a discrepancy between the utilization of the one or more storage resources by the compute instance and the performance attribute, based on the information; and
causing an adjustment to an allocation of storage resources associated with the compute instance based on the difference.

2. The device of claim 1, wherein the performance attribute is one of: a measure of input/output operations per second (IOPS), a measure of bandwidth, a measure of latency, a measure of storage capacity, and a measure of cost.

3. The device of claim 2, wherein:
the performance attribute is a first measure of IOPS; and
the one or more storage resources allocated to the compute instance include a selected storage resource associated with a second measure of IOPS;
the operations further comprising:
determining that a number of input/output operations per second performed by the one or more storage resources allocated to the compute instance is less than a predetermined limit; and
removing the selected storage resource from the one or more storage resources allocated to the compute instance.

4. The device of claim 3, the operations further comprising:
adding to the one or more resources allocated to the compute instance a second storage resource having a third measure of IOPS different from the second measure of IOPS.

5. The device of claim 2, wherein:
the performance attribute is a measure of storage capacity; and
the one or more storage resources allocated to the compute instance have a first storage capacity,
the operations further comprising:
determining that a second storage capacity utilized by the compute instance is less than a predetermined limit; and
removing from the one or more storage resources allocated to the compute instance a selected storage resource, thereby reducing the first storage capacity of the one or more storage resources allocated to the compute instance.

6. The device of claim 1, wherein each of the one or more storage resources is a storage device.

7. A system comprising:
a plurality of storage resources distributed within a network, the plurality of storage resources comprising one or more first storage resources associated with a first performance class associated with a first measure of a performance attribute and one or more second storage resources associated with a second performance class associated with a second measure of the performance attribute, the second measure being different from the first measure; and
an optimization component having access to the plurality of storage resources, the optimization component adapted to:

receive information relating to utilization, by a compute instance operating within the network, of allocated storage resources, the allocated storage resources being selected from among the plurality of storage resources;
determine that a change to the allocated storage resources is necessary, based on the information; and
adjust one of:
a first quantity of first storage resources in the allocated storage resources; and
a second quantity of second storage resources in the allocated storage resources;
wherein:
the first performance class is associated with a first measure of storage capacity; and
the second performance class is associated with a second measure of storage capacity lower than the first measure.

8. The system of claim 7, wherein the optimization component is further adapted to:
determine that a third measure of storage capacity used by the compute instance is less than a predetermined limit; and
remove from the allocated storage resources a selected storage resource.

9. The system of claim 8, wherein the optimization component is further adapted to:
remove from the allocated storage resources a first storage resource; and
add to the allocated storage resources a second storage resource.

10. The system of claim 7, wherein the optimization component is further adapted to:
determine that a third measure of storage capacity used by the compute instance is greater than a predetermined limit; and
add to the allocated storage resources a selected storage resource.

11. A system comprising:
a plurality of storage resources distributed within a network, the plurality of storage resources comprising one or more first storage resources associated with a first performance class associated with a first measure of a performance attribute and one or more second storage resources associated with a second performance class associated with a second measure of the performance attribute, the second measure being different from the first measure; and
an optimization component having access to the plurality of storage resources, the optimization component adapted to:
receive information relating to utilization, by a compute instance operating within the network, of allocated storage resources, the allocated storage resources being selected from among the plurality of storage resources;
determine that a change to the allocated storage resources is necessary, based on the information; and
adjust one of:
a first quantity of first storage resources in the allocated storage resources; and
a second quantity of second storage resources in the allocated storage resources;
wherein:
the first performance class is associated with a first measure of input/output operations per second (IOPS); and
the second performance class is associated with a second measure of IOPS lower than the first measure of IOPS.

12. The system of claim 11, wherein the optimization component is further adapted to:
determine that a number of IOPS performed by the allocated storage resources is less than a predetermined limit; and
remove from the allocated storage resources a selected storage resource.

13. The system of claim 12, wherein the optimization component is further adapted to:
remove from the allocated storage resources a first storage resource; and
add to the allocated storage resources a second storage resource.

14. The system of claim 11, wherein the optimization component is further adapted to:
determine that a number of IOPS performed by the allocated storage resources is greater than a predetermined limit; and
add to the allocated storage resources a selected storage resource.

15. A system comprising:
a plurality of storage resources distributed within a network, the plurality of storage resources comprising one or more first storage resources associated with a first performance class associated with a first measure of a performance attribute and one or more second storage resources associated with a second performance class associated with a second measure of the performance attribute, the second measure being different from the first measure; and
an optimization component having access to the plurality of storage resources, the optimization component adapted to:
receive information relating to utilization, by a compute instance operating within the network, of allocated storage resources, the allocated storage resources being selected from among the plurality of storage resources;
determine that a change to the allocated storage resources is necessary, based on the information; and
adjust one of:
a first quantity of first storage resources in the allocated storage resources; and
a second quantity of second storage resources in the allocated storage resources;
wherein
the first performance class is associated with a first measure of bandwidth; and
the second performance class is associated with a second measure of bandwidth lower than the first measure of bandwidth.

16. A system comprising:
a plurality of storage resources distributed within a network, the plurality of storage resources comprising one or more first storage resources associated with a first performance class associated with a first measure of a performance attribute and one or more second storage resources associated with a second performance class associated with a second measure of the performance attribute, the second measure being different from the first measure; and
an optimization component having access to the plurality of storage resources, the optimization component adapted to:

receive information relating to utilization, by a compute instance operating within the network, of allocated storage resources, the allocated storage resources being selected from among the plurality of storage resources;

determine that a change to the allocated storage resources is necessary, based on the information; and adjust one of:
- a first quantity of first storage resources in the allocated storage resources; and
- a second quantity of second storage resources in the allocated storage resources;

wherein:
- the first performance class is associated with a first measure of latency; and
- the second performance class is associated with a second measure of latency lower than the first measure of latency.

17. A system comprising:

a plurality of storage resources distributed within a network, the plurality of storage resources comprising one or more first storage resources associated with a first performance class associated with a first measure of a performance attribute and one or more second storage resources associated with a second performance class associated with a second measure of the performance attribute, the second measure being different from the first measure; and an optimization component having access to the plurality of storage resources, the optimization component adapted to:

receive information relating to utilization, by a compute instance operating within the network, of allocated storage resources, the allocated storage resources being selected from among the plurality of storage resources;

determine that a change to the allocated storage resources is necessary, based on the information; and adjust one of:
- a first quantity of first storage resources in the allocated storage resources; and
- a second quantity of second storage resources in the allocated storage resources;

wherein:
- the first performance class is associated with a first measure of cost; and
- the second performance class is associated with a second measure of cost lower than the first measure of cost.

18. A method comprising:

installing an agent component on a compute instance residing in a cloud services system, the compute instance comprising a specified processing capacity and a specified storage capacity, wherein one or more processing resources in the cloud services system are allocated to the compute instance and one or more storage resources in the cloud services system are allocated to the compute instance, wherein the one or more storage resources have a performance attribute;

receiving from the agent component information relating to utilization by the compute instance of the one or more storage resources allocated to the compute instance;

determining a discrepancy between the utilization of the one or more storage resources by the compute instance and the performance attribute, based on the information; and causing an adjustment to an allocation of storage resources associated with the compute instance based on the difference.

19. The method of claim 18, wherein the performance attribute is one of: a measure of input/output operations per second (IOPS), a measure of bandwidth, a measure of latency, a measure of storage capacity, and a measure of cost.

* * * * *